United States Patent
O'Brien et al.

(10) Patent No.: US 8,082,277 B1
(45) Date of Patent: Dec. 20, 2011

(54) SYSTEMS AND METHODS FOR GENERATING TECHNICAL DOCUMENTS

(75) Inventors: Sue O'Brien, Gurley, AL (US); Dawn M. Sabados, Madison, AL (US); Lance Warden, Huntsville, AL (US)

(73) Assignee: The Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 828 days.

(21) Appl. No.: 12/004,685

(22) Filed: Dec. 21, 2007

Related U.S. Application Data

(60) Provisional application No. 60/942,146, filed on Jun. 5, 2007, provisional application No. 60/950,339, filed on Jul. 18, 2007.

(51) Int. Cl.
*G06F 17/00* (2006.01)
*G06F 7/00* (2006.01)
*G06F 9/44* (2006.01)

(52) U.S. Cl. ........ 707/802; 707/758; 707/781; 715/200; 717/123

(58) Field of Classification Search ............... 707/999.1, 707/705, 758, 781, 802; 715/200; 717/123
See application file for complete search history.

(56) References Cited

U.S. PATENT DOCUMENTS

| | | | | |
|---|---|---|---|---|
| 5,040,142 A | * | 8/1991 | Mori et al. | 715/203 |
| 5,436,730 A | * | 7/1995 | Hube | 358/401 |
| 5,557,780 A | * | 9/1996 | Edwards et al. | 703/27 |
| 5,606,609 A | * | 2/1997 | Houser et al. | 713/179 |
| 5,850,219 A | * | 12/1998 | Kumomura | 715/751 |
| 5,966,718 A | * | 10/1999 | Shibata | 715/222 |
| 6,065,026 A | * | 5/2000 | Cornelia et al. | 715/202 |
| 6,070,175 A | * | 5/2000 | Mezei | 715/205 |
| 6,161,113 A | * | 12/2000 | Mora et al. | 715/234 |
| 6,279,031 B1 | * | 8/2001 | Kawasaki et al. | 709/207 |

(Continued)

FOREIGN PATENT DOCUMENTS

WO   WO 02/03174 A2  *  1/2002

OTHER PUBLICATIONS

Sheldon, Robert, et al., Beginning MySQL, Wiley Publishing, Inc., Indianapolis, IN, © 2005, pp. 7-9, 34, 40-41, 43-44, 64, 73-74, 83, 140, 229 and 667.*

(Continued)

*Primary Examiner* — Robert Stevens
(74) *Attorney, Agent, or Firm* — Lanier Ford Shaver & Payne, P.C.; Jon E. Holland

(57) ABSTRACT

Systems and methods for generating technical documents are provided. An exemplary embodiment of one such system includes a server computer system for generating technical documents having a database for storing information needed to generate technical documents, and a processor operable to cause the server computer system to allow multiple users to access the server computer system, input information needed to generate technical documents, and generate technical documents using the information input by the multiple users. An exemplary embodiment of one such method includes the steps of providing a server computer system operable to generate technical documents and allowing multiple users to access the server computer system, input information necessary for generating technical documents into the server computer system, and generate technical documents using the server computer system.

17 Claims, 36 Drawing Sheets

U.S. PATENT DOCUMENTS

| | | | | |
|---|---|---|---|---|
| 6,587,121 | B1* | 7/2003 | Nelson et al. | 715/705 |
| 6,684,212 | B1* | 1/2004 | Day et al. | 1/1 |
| 6,816,762 | B2* | 11/2004 | Hensey et al. | 701/35 |
| 6,912,660 | B1* | 6/2005 | Petrogiannis | 713/181 |
| 6,996,601 | B1* | 2/2006 | Smith | 709/203 |
| 7,051,036 | B2* | 5/2006 | Rosnow et al. | 707/723 |
| 7,072,940 | B1* | 7/2006 | Day et al. | 709/204 |
| 7,353,232 | B1* | 4/2008 | Kalucha et al. | 705/64 |
| 7,403,948 | B2* | 7/2008 | Ghoneimy et al. | 707/792 |
| 2001/0042088 | A1* | 11/2001 | Hotchkiss et al. | 707/530 |
| 2002/0019838 | A1* | 2/2002 | Petrogiannis | 707/530 |
| 2002/0035408 | A1* | 3/2002 | Smith | 700/97 |
| 2002/0111824 | A1* | 8/2002 | Grainger | 705/1 |
| 2003/0097410 | A1* | 5/2003 | Atkins et al. | 709/206 |
| 2003/0106039 | A1* | 6/2003 | Rosnow et al. | 717/100 |
| 2003/0109973 | A1* | 6/2003 | Hensey et al. | 701/35 |
| 2003/0135466 | A1* | 7/2003 | Wang et al. | 705/51 |
| 2003/0163724 | A1* | 8/2003 | Tayebi et al. | 713/200 |
| 2004/0021686 | A1* | 2/2004 | Barberis | 345/738 |
| 2004/0122843 | A1* | 6/2004 | Terris et al. | 707/102 |
| 2004/0172450 | A1* | 9/2004 | Edelstein et al. | 709/205 |
| 2004/0186762 | A1* | 9/2004 | Beaven et al. | 705/8 |
| 2004/0267871 | A1* | 12/2004 | Pratley et al. | 709/200 |
| 2005/0055239 | A1* | 3/2005 | Farmer | 705/1 |
| 2005/0192957 | A1* | 9/2005 | Newbold | 707/5 |
| 2005/0246216 | A1* | 11/2005 | Rosen et al. | 705/8 |
| 2006/0031124 | A1* | 2/2006 | Galbraith | 705/26 |
| 2006/0075324 | A1* | 4/2006 | Whitten et al. | 715/500 |
| 2006/0224629 | A1* | 10/2006 | Alexander et al. | 707/104.1 |
| 2007/0112788 | A1* | 5/2007 | Kobza et al. | 707/10 |
| 2007/0203737 | A1* | 8/2007 | Boozer | 705/1 |
| 2007/0220086 | A1* | 9/2007 | Goldberg et al. | 709/203 |
| 2008/0005240 | A1* | 1/2008 | Knighton et al. | 709/204 |
| 2008/0018926 | A1* | 1/2008 | Abraham et al. | 358/1.15 |
| 2008/0028300 | A1* | 1/2008 | Krieger et al. | 715/255 |
| 2010/0169304 | A1* | 7/2010 | Hendricksen et al. | 707/723 |

OTHER PUBLICATIONS

Haake, Jörg M., et al., "Supporting Collaborative Writing of Hyperdocuments in SEPIA", CSCW 92 Proceedings, Nov. 1992, pp. 138-146.*

Setchi, R., et al., "The Development of a Hypermedia Maintenance Manual for an Advanced Manufacturing Company", Int. J. Manf. Technol., vol. 22, © 2003, pp. 456-464.*

Adler, Andy, et al., "Evaluating and Implementing a Collaborative Office Document System", Interacting with Computers, vol. 18, Issue 4, Jul. 2006, pp. 665-682.*

Peters, Ralph, et al., "CrystalWeb—A Distributed Authoring Environment for the World-Wide Web", Computer Networks and ISDN Systems, Apr. 1995, pp. 861-870.*

Bachmann, Felix, et al., "Experience Using the Web-Based Tool Wiki for Architecture Documentation", Technical Note CMU/SEI-2005-TN-041, Carnegie Mellon Univ. (sponsored by the US Dept. of Defense), Sep. 2005, 45 pages.*

Bishop, Kevin W., et al., "From Dated to Dynamic: A Campus Newsletter Unfolds as a Web Service", SIGUCCS '02, Providence, RI, Nov. 20-23, 2002, pp. 1-4.*

Nguyen, Tien N., et al., "Fine-grained, Structured Configuration Management for Web Projects", WWW 2004, New York, NY, May 17-22, 2004, pp. 433-442.*

Smith, John B., et al., "ABC: A Hypermedia System for Artifact-Based Collaboration", Hypertext '91 Proceedings, Dec. 1991, pp. 179-192.*

Hasan, Helen, et al., "The Wiki: An Environment to Revolutionise Employees' Interaction with Corporate Knowledge", OZCHI 2006, Sydney, Australia, Nov. 20-24, 2006, pp. 377-380.*

Whitehead, Jr., E. James, et al., "World Wide Web Distributed Authoring and Versioning (WeBDAV): An Introduction", StandardView, vol. 5, No. 1, Mar. 1997, pp. 3-8.*

Dourish, Paul, et al., "Extending Document Management Systems with User-Specific Active Properties", ACM Transactions on Information Systems, vol. 18, No. 2, Apr. 2000, pp. 140-170.*

LaMarca, Anthony, et al., "Taking the Work Out of Workflow: Mechanism for Document-Centered Collaboration", Proc. of the 6th European Conf. on CSCW, Copenhagen, Denmark, Sep. 12-16, 1999, pp. 1-20.*

Grundy, J., et al., "Engineering Plug-in Software Components to Support Collaborative Work", Software—Practice and Experience, vol. 32, © 2002, pp. 983-1013.*

Isenhour, P. L., et al., "Supporting Interactive Collaboration on the Web with CORK", Interacting with Computers, vol. 13, © 2001, pp. 655-676.*

Microsoft Computer Dictionary, 5th Edition, Microsoft Press, Redmond. WA, © 2002, p. 281.*

Bertino, Elisa, et al., "Securing XML Documents with Author-X", IEEE Internet Computing, May/Jun. 2001, pp. 21-31.*

Botha, Reinhardt, et al., "An Access Control Architecture for XML documents in workflow environments", CiteSeer, © 2002, pp. 1-10.*

Damiani, Ernesto, et al., "A Fine-Grained Access Control System for XML Documents", ACM Transactions on Information and System Security, vol. 5, No. 2, May 2002, pp. 169-202.*

Sandhu, Ravi S., et al., "Role-Based Access Control Models", Computer, vol. 29, Issue 2, © IEEE, Feb. 1996, pp. 38-47.*

Zhang, Z., et al., "Role-based Access Control in Online Authoring and Publishing Systems vs. Document Hierarchy", SIGDOC '99, New York, NY, © 1999 ACM, pp. 193-198.*

Bertino, Elisa, et al., "Controlled Access and Dissemination of XML Documents", WIDM '99, Kansas City, MO, © 1999, pp. 22-27.*

Goodwin, Richard, et al., "Instance-level access control for business-to-business electronic commerce", IBM Systems Journal, vol. 41, No. 2, © 2002, pp. 303-317.*

Adkins, Mark, et al., "GSS Collaboration in Document Development: Using GroupWriter to Improve the Process", HICSS-32, Maui, HI, Jan. 5-8, 1999, pp. 1-11.*

Kumar, Akhil, et al., "Dynamic Routing and Operational Controls in Workflow Management Systems", Management Science, vol. 45, Issue 2, Feb. 1999, pp. 1-30.*

Michael W. Wynne, "Policy for Systems Engineering in DoD," The Under Secretary of Defense Memorandum, Feb. 20, 2004, 3 pages.

Glenn F. Lamartin, "Implementing Systems Engineering Plans in DoD—Interim Guidance," Office of the Under Secretary of Defense Memorandum, Mar. 30, 2004, 3 pages.

Michael W. Wynne, "Policy Addendum for Systems Engineering," The Under Secretary of Defense Memorandum, Oct. 22, 2004, 2 pages.

"Systems Engineering Plan (SEP) Preparation Guide Version 1.02," Departement of Defense, Feb. 10, 2006, pp. 1-31.

* cited by examiner

SYSTEMS AND METHODS FOR GENERATING TECHNICAL DOCUMENTS

CROSS-REFERENCE TO RELATED APPLICATIONS

This application claims priority U.S. Provisional Patent Application Nos. 60/942,146, filed on Jun. 5, 2007 and entitled "Document Generation Tools," and 60/950,339, filed on Jul. 17, 2007 and entitled "System and Method for Generating Systems Engineering Plans and Other Technical Documents." The '146 and '339 applications are hereby incorporated by reference into the present application.

STATEMENT REGARDING FEDERALLY SPONSORED RESEARCH OR DEVELOPMENT

This invention was made with government support under Contract no. W31P4Q-05-C-0136 awarded by the Army Program Executive Office Aviation. The government has certain rights in the invention.

BACKGROUND

1. Technical Field

This disclosure generally relates to systems and methods for generating technical documents.

2. Description of the Related Art

In 2004, the Department of Defense (DoD) for the United States of America determined that there was a need for the use of Systems Engineering Plans to develop complex military systems. Detailed information regarding this determination may be found in a Memorandum from the Acting Under Secretary of Defense for Acquisition, Technology and Logistics (USDAT&L) dated Feb. 20, 2004 and including the subject line "Policy for Systems Engineering in DoD", a Memocandum from the Director of Defense Systems for the USDAT&L dated Mar. 30, 2004 and including the subject line "Implementing Systems Engineering Plans in DoD—Interim Guidance," and a second Memorandum from the Acting Under Secretary dated Oct. 22, 2004 and including the subject line "Policy Addendum for Systems Engineering."

Information regarding the proper preparation of Systems Engineering Plans may be found in the Systems Engineering Plan (SEP) Preparation Guide, Version 1.0, dated Aug. 15, 2005 and issued by the Office of the Under Secretary of Defense for Acquisition, Technology, and Logistics Defense Systems, Systems Engineering, Enterprise Development, as well as the Defense Acquisition Guidebook (DAG), particularly Chapter 4 of that guidebook which is entitled Systems "Engineering." All of the documents referenced above in this paragraph are hereby incorporated by reference into the present application.

Despite the existence of the SEP Preparation Guide and DAG, Systems Engineering Plans are complicated documents that can be difficult and time-consuming to create. In addition, these documents must be created multiple times during any given program because they must be approved by the appropriate Milestone Decision Authority in connection with each Milestone review for the program.

SUMMARY

Systems and methods for generating technical documents, including Systems Engineering Plans (SEPs), are provided. In an exemplary embodiment, one such system includes a server computer system for generating technical documents having a database for storing information needed to generate technical documents, and a processor operable to cause the server computer system to allow multiple users to access the server computer system, input information needed to generate technical documents, and generate technical documents using the information input by the multiple users.

Another exemplary embodiment includes a computer system for generating technical documents having a server computer system operable to generate technical documents using information stored in the server computer system and input by multiple users, and a plurality of client computer systems connected to the server computer system using the World Wide Web, the plurality of client computer systems being operable to allow the multiple users to input information necessary for generating technical documents into the server computer system and to generate technical documents using the server computer system.

An exemplary embodiment of a method for generating technical documents includes the steps of providing a server computer system operable to generate technical documents, and allowing multiple users to access the server computer system, input information necessary for generating technical documents into the server computer system, and generate technical documents using the server computer system.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Figure 1:
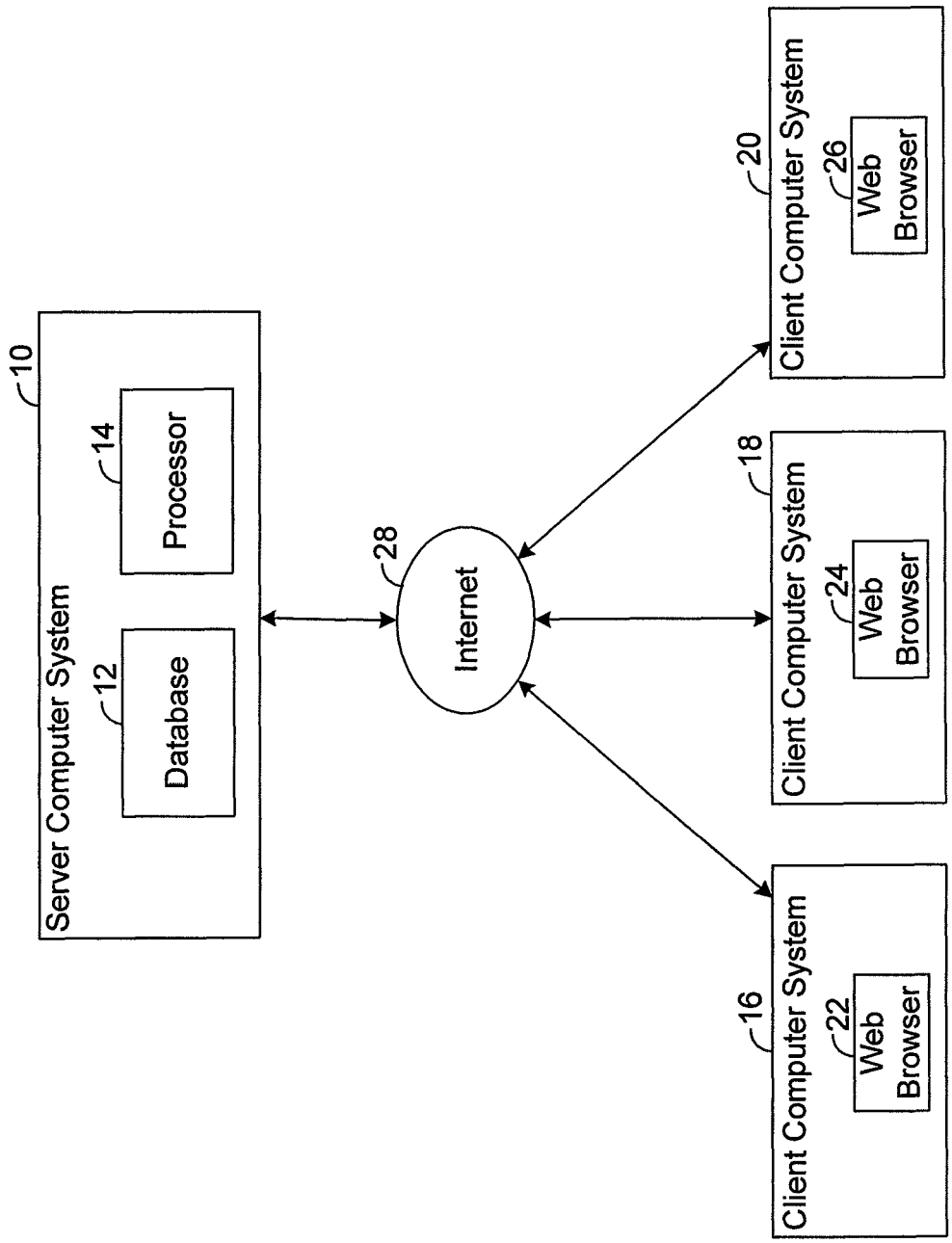
FIG. 1 is a block diagram showing one exemplary embodiment of the present invention.

Systems and methods for generating technical documents are provided. Technical documents that can be generated using the systems and methods disclosed herein include (but are not limited to): System Engineering Plans; Acquisition Plans; Acquisition Strategies; Technical Review Entrance and Exit Checklists; Technical Review Evaluation Documents; Test and Evaluation Master Plan documents; NASA Safety Data Packages; Interface Control Documents; Team Charters; System Engineering Management Plans; Airworthiness Criteria and Documentation; Technical Manuals; Requests for Proposal Documents; Risk Management Plans; Analysis of Alternatives Documents; Initial Capabilities Documents; Capabilities Development Documents; Joint Capability Documents; Statements of Work; Cost Performance Reports; Integrated Master Plans; and Capabilities Production Documents.

One exemplary system (FIG. 1) includes a server computer system 10 having a database 12 and a processor 14. Database 12 stores various different types of information needed to generate technical documents, as well as the technical documents themselves. For example, database 12 stores login information (username and password) for users authorized to use server computer system 10. This information is used by processor 14 to verify that a user attempting to log on to the system is authorized to do so.

Database 12 stores information regarding technical documents that each user is authorized to access and each user's permission level or levels for the documents. Processor 14 uses this information to limit each user's access to technical documents he or she is authorized to work on and to limit the types of actions that can be taken by a user with respect to one of these documents. Processor 14 also uses this information by displaying it to users when they log on to server computer system 10.

Server computer system 10 includes six (6) different user permission levels: 1) reader; 2) writer; 3) reviewer; 4) administrator; 5) approver; and 6) version controller. A user designated as a reader for a technical document can read the document and reviewer's comments relating to the document, generate a .pdf version of the document, and generate a .pdf version of a working copy of the document that includes writer's notes and reviewer's comments. Readers can send email messages to other users and can view, delete, and respond to email messages from other users. Readers can view information relating to changes made to sections in technical documents, including the names of sections that have changes, the names of users making changes to sections, the dates changes were made to sections, and the changes made to sections. Readers can also view previous versions of information included in sections of technical documents, instructions and/or questions relating to sections included in technical documents, and reviewer's comments relating to sections in technical documents.

Writer designated users create technical documents by entering text, tables, and figures (all of which are stored in database 12) into the documents. Writers can upload images and attachments into technical documents. Writers can generate acronym lists for technical documents. The acronym list for a given technical document includes a listing of all of the acronyms included in the document and the meanings for those acronyms.

When a section of a technical document is complete, a writer submits the section for review by reviewers. If a reviewer requests changes to a technical document, writers implement those changes. Writers have permission to modify any text field that is not currently under review, upload and delete images and attachments, and generate .pdf versions of technical documents, including working copies.

Reviewer designated users receive email alerts when sections of technical documents are considered complete by writers. Reviewers read these sections to determine if they are complete and ready for inclusion in the technical documents. If not, reviewers make comments (which are stored in database 12) and return the sections to the writers for further work. Reviewers have permission to read text in progress, send email messages, make comments on sections available for review, approve or reject sections available for review, and generate .pdf versions of technical documents.

Users designated as administrators can associate users with technical documents and modify a user's permission levels with respect to technical documents.

Approvers receive emails when technical documents are considered ready by writers and reviewers working on the documents. Approvers read technical documents and decide whether they are ready to be submitted as a new version to the agency requiring the document, e.g., the Office of the Secretary of Defense (OSD), etc. If an approver determines that a technical document is not ready, their job is to make comments and return the technical document to the writers to address these comments. Approvers have permission to generate .pdf versions of technical documents, including working copies, and make comments regarding technical documents using Review Sheets, which are discussed in more detail below. Approvers also have permission to view, delete, and reply to email messages from other users.

Version Controllers can configure technical documents and set up the title and coordination pages for these documents. In one embodiment, version controllers are the only users who can change the version number for a document.

Users can be designated as readers, writers, reviewers, administrators, approvers, version controllers, or any combination thereof, with respect to any technical document stored in database 12.

Database 12 stores information regarding: 1) email messages sent by users, including the dates messages were sent, the users the emails were sent to, the technical documents associated with the emails, and the email messages themselves; and 2) changes made to sections of technical documents, including the names of sections that have been changed, the names of users making the changes, and the dates the changes were made. This information is displayed to users by processor 14 when they log on to server computer system 10.

Information regarding files uploaded to server computer system 10 (and available for use in creating technical documents) is stored in database 12, including file names, file sizes, the technical documents associated with the files, the names of users who uploaded the files, and the dates the files were uploaded to system 10. Processor 14 displays this information to users when uploading files to system 10.

Database 12 includes information regarding software modification requests filed by users. Software modification requests include feature requests (requests to add features to processor 14), bug reports (requests to correct bugs in processor 14, and other requests (requests for software modifications that do not fall within the first two categories).

Information regarding frequently asked questions relating to server computer system 10 is also stored in database 12.

This information includes information regarding how writers, reviewers, and approvers use system 10, as well as how to make title and coordinating pages for technical documents using system 10. This information further, includes information regarding how to create, upload, and delete images in technical documents, how to create jpegs, how to view technical documents, how to upload appendixes, and how to create acronym lists. This information includes information regarding how to enter Integrated Product Team and planned review information, how to create tables in technical documents, and how data entered into system 10 is saved. Finally, this information includes information explaining how to use various icons (history, image, maximize, help, check spelling, message, and make comment icons) generated by processor 14 in screens (discussed in detail below) displayed to users when using system 10.

Database 12 includes information regarding the various section headings for sections included in technical documents, instructions and/or questions relating to the type of information to include in each section, and previous versions of information included in each section. Processor 14 displays the section headings, as well as the instructions and/or questions and previous versions of section information, to users in order to facilitate the entry of information needed to generate technical documents into system 10.

Figure 2:
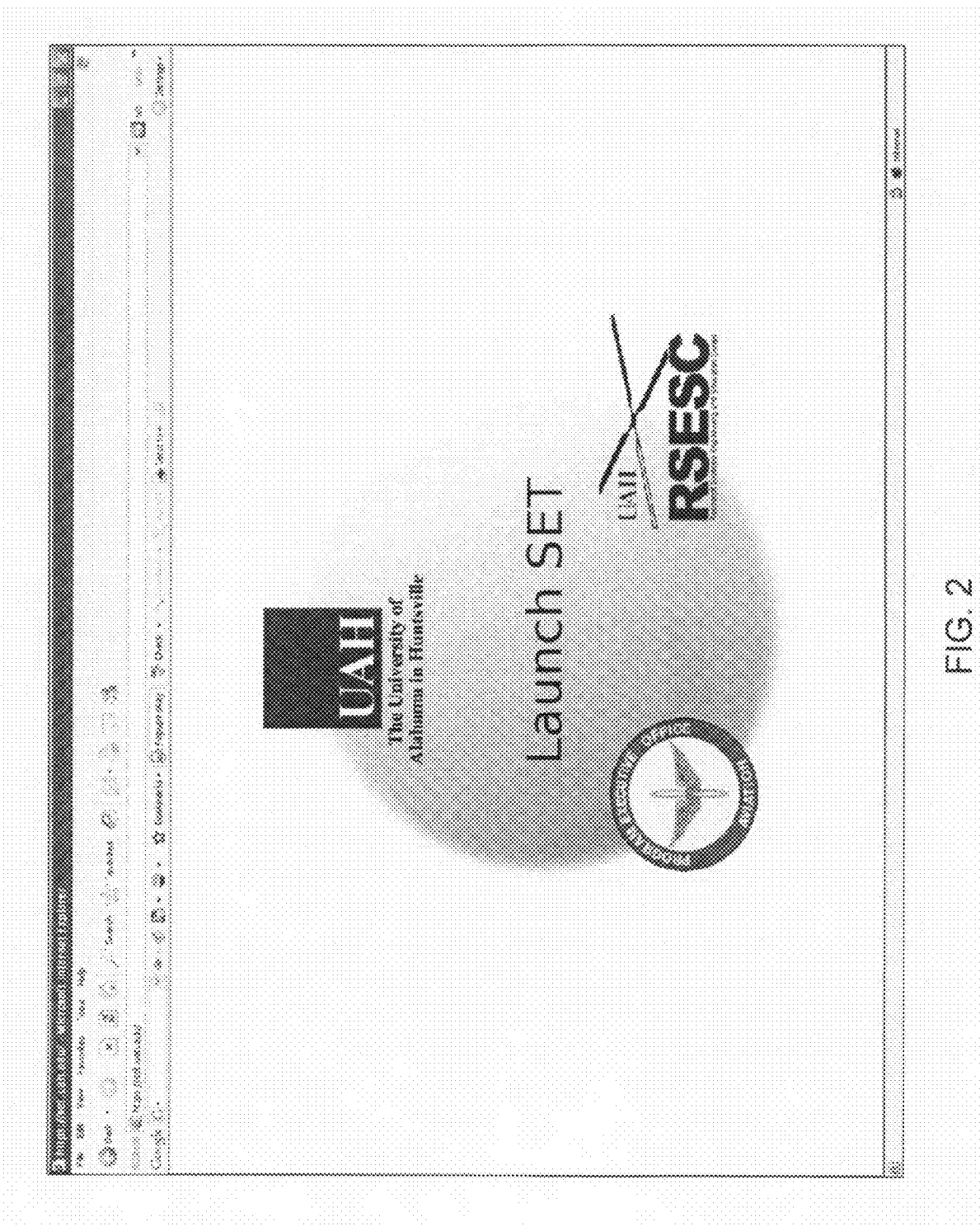
FIG. 2 is a screen shot of an initial screen presented to a user in an exemplary embodiment of the present invention.

Processor 14 (which may include a variety of different modules to perform the functions set forth below) allows users to perform a variety of different functions with server computer system 10. For example, processor 14 allows multiple users to access server computer system 10 using client computer systems, 16, 18, and 20, web browsers, 22, 24, and 26, and the Internet 28 (FIG. 1). Once they have accessed the system, users can input information needed to generate technical documents into the system and can then generate technical documents using that information. An example of the initial screen generated and displayed to users when they initially connect to system 10 is shown in FIG. 2.

Figure 3:
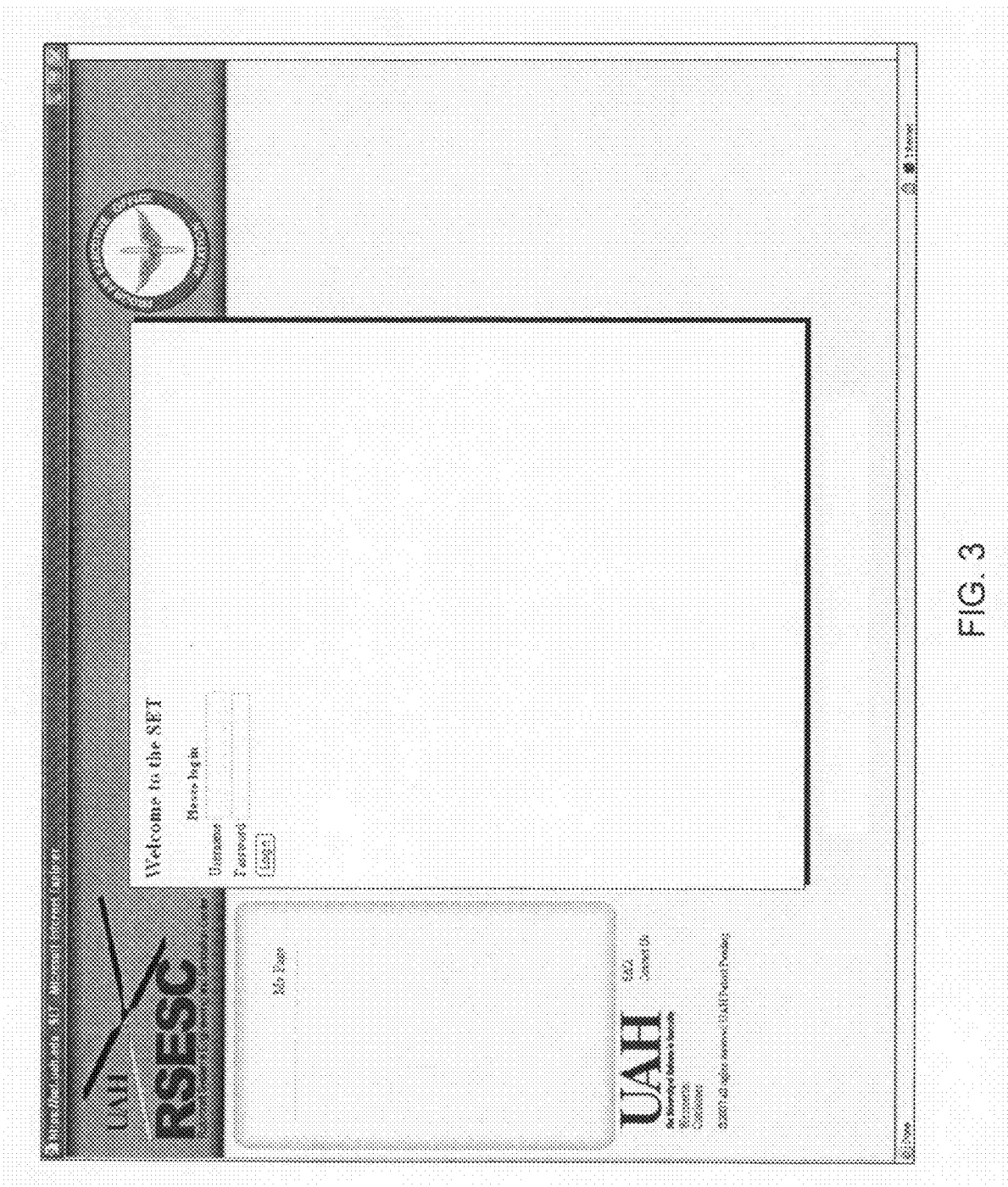
FIG. 3 is a screen shot of a log in screen presented to a user in an exemplary embodiment of the present invention.
Figure 4:
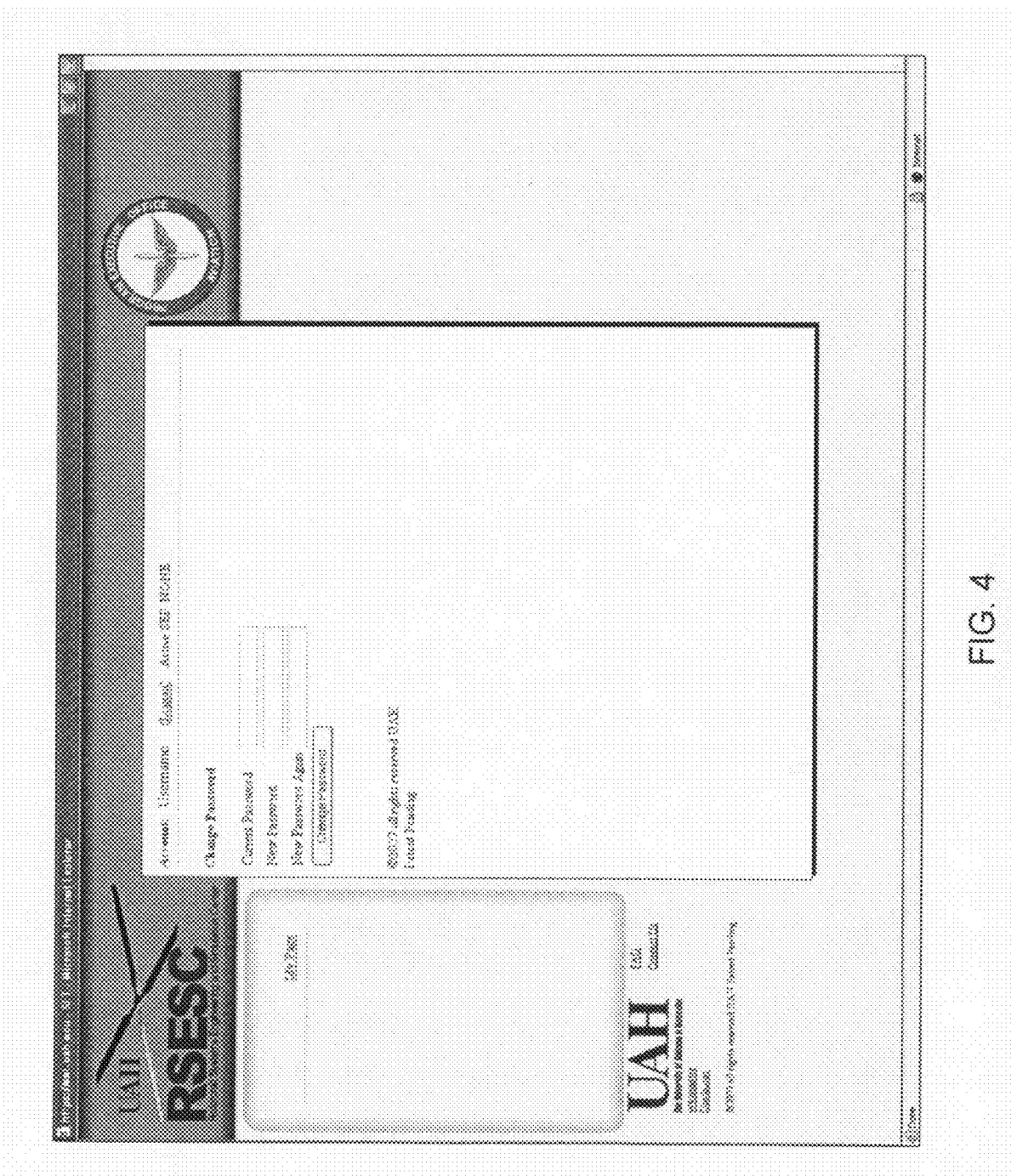
FIG. 4 is a screen shot of a Change Password screen presented to a user in an exemplary embodiment of the present invention.

Processor 14 allows users to log on to system 10 using a username and password and to change their passwords when desired. In one exemplary embodiment, processor 14 requires users to change their passwords after they log on to the system for the first time. Examples of screens that can be used by users to log on to the system and to change their passwords are shown in FIG. 3 and FIG. 4.

After a user has logged on, processor 14 displays various types of information to users, including listings of technical documents the users are authorized to work on and the user's permission levels with respect to the technical documents. An example of a screen generated by the system containing this information is shown in FIG. 5.

Figure 5:
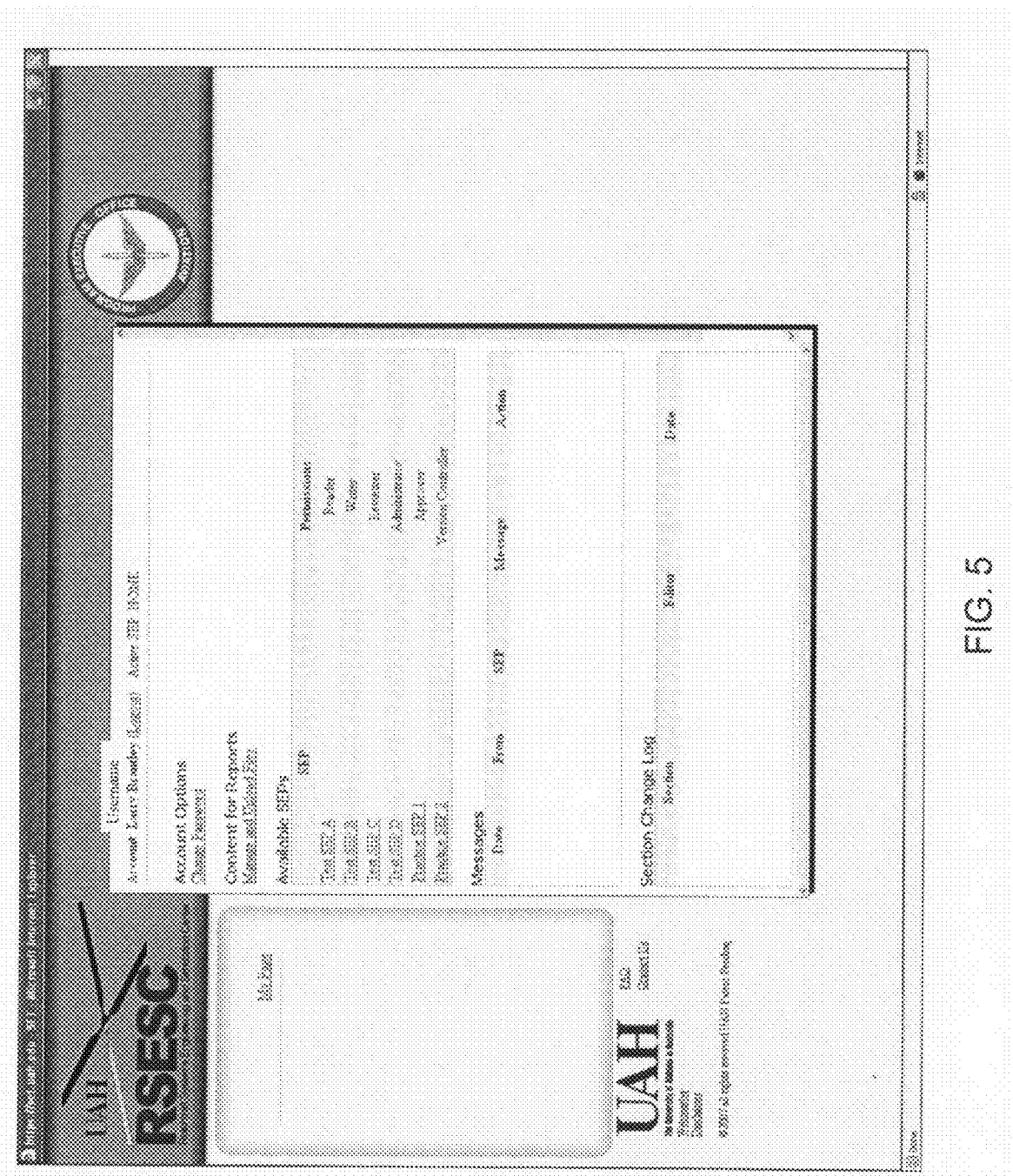
FIG. 5 is a screen shot of a My Page screen presented to a user in an exemplary embodiment of the present invention.

The information regarding technical documents and permission levels is included under the section entitled "Available SEPs" in FIG. 5 and only includes a listing of Systems Engineering Plans or SEPs (Test SEP A, Test SEP B, etc.). It should be noted that other embodiments may include other types of technical documents.

As discussed above, processor 14 allows users to change their passwords after they have logged on to system 10. This is accomplished in one embodiment by clicking on the "Change Password" link shown in FIG. 5. Clicking on this link causes processor 14 to display the screen shown in FIG. 4, which can then be used by users to change their passwords.

Processor 14 allows users to upload files to system 10 for use in generating technical documents and to delete files that have been previously uploaded. In one embodiment, this is accomplished by clicking on the "Manage and Upload Files" link shown in FIG. 5, which causes processor 14 to display the screen shown in FIG. 6.

Figure 6:
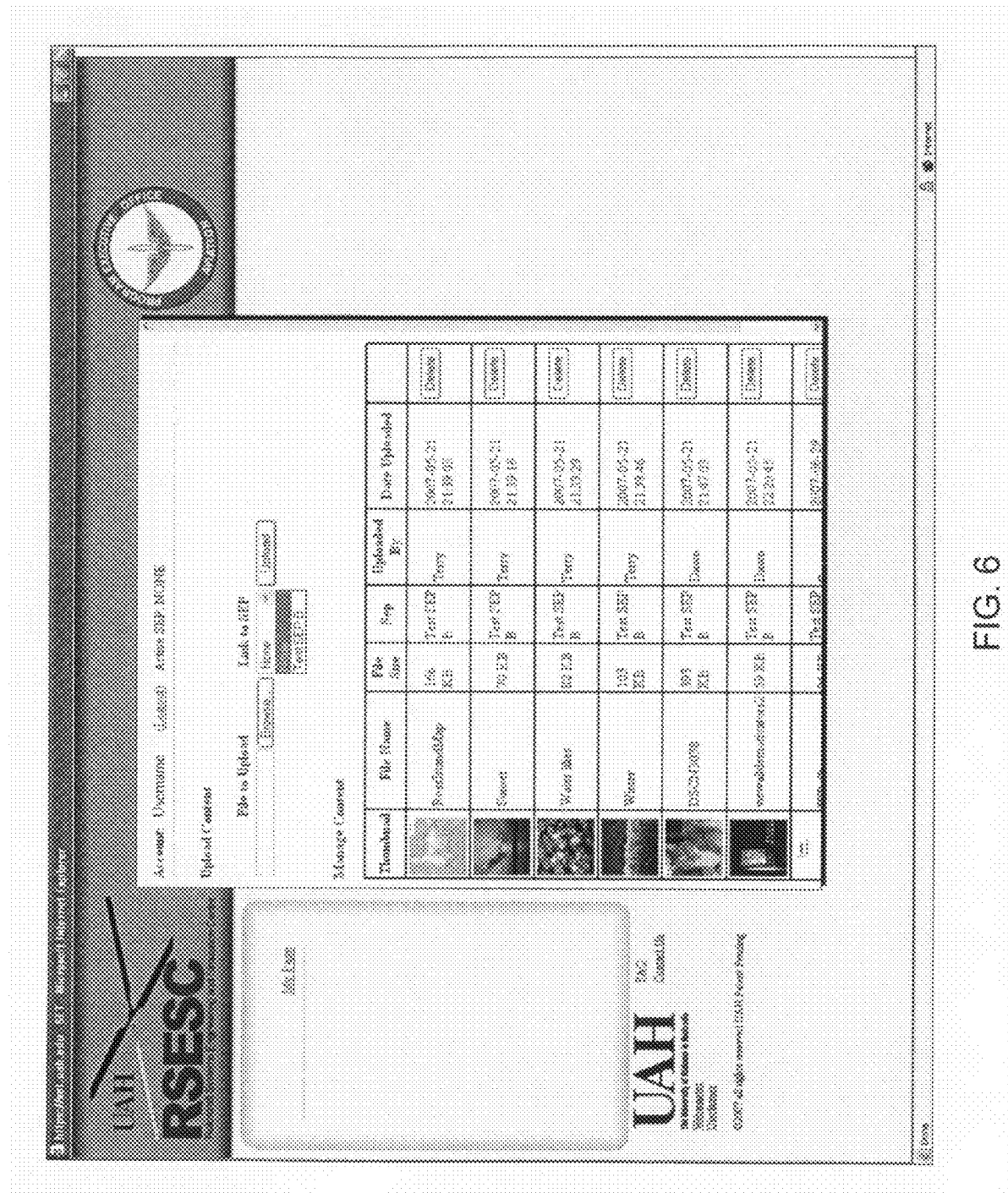
FIG. 6 is a screen shot of an Upload and Manage Content screen presented to a user in an exemplary embodiment of the present invention.

FIG. 6 includes a "Browse" button, which can be used to locate files on client computers connected to system 10 as shown in FIG. 1, and a drop down menu that allows users to link files to specific technical documents stored in system 10. FIG. 6 also includes a listing of files that have already been uploaded to system 10. This listing includes thumbnail pictures for files, as well as information regarding file names, file sizes, linked technical documents, names of users who uploaded the files, and the dates files were uploaded. The "Delete" buttons shown in FIG. 6 can be used to delete files from the system.

Figure 7:
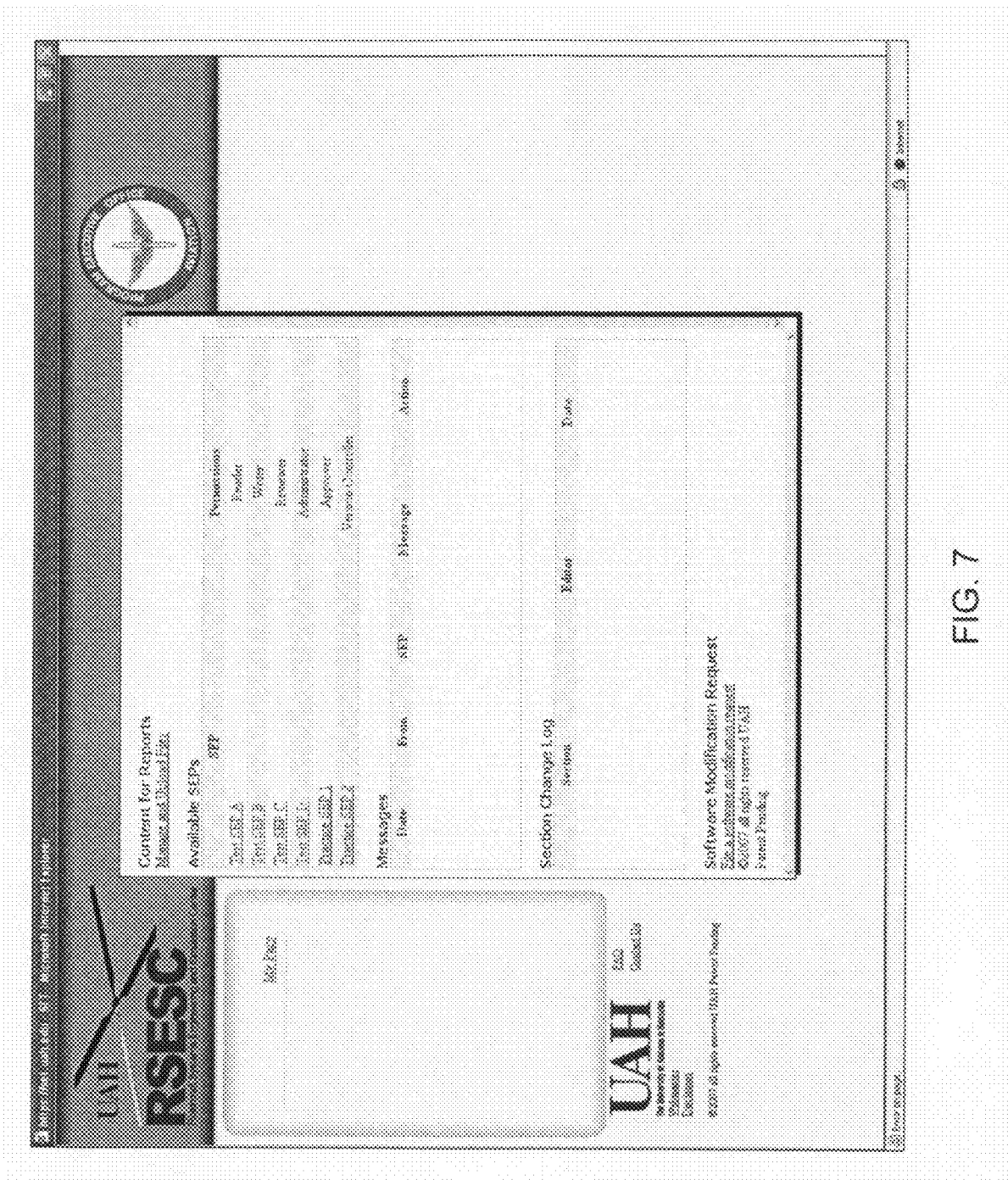
FIG. 7 is a screen shot of the My Page screen shown in FIG. 5 scrolled down to show the Software Modification Request portion of the screen.
Figure 8:
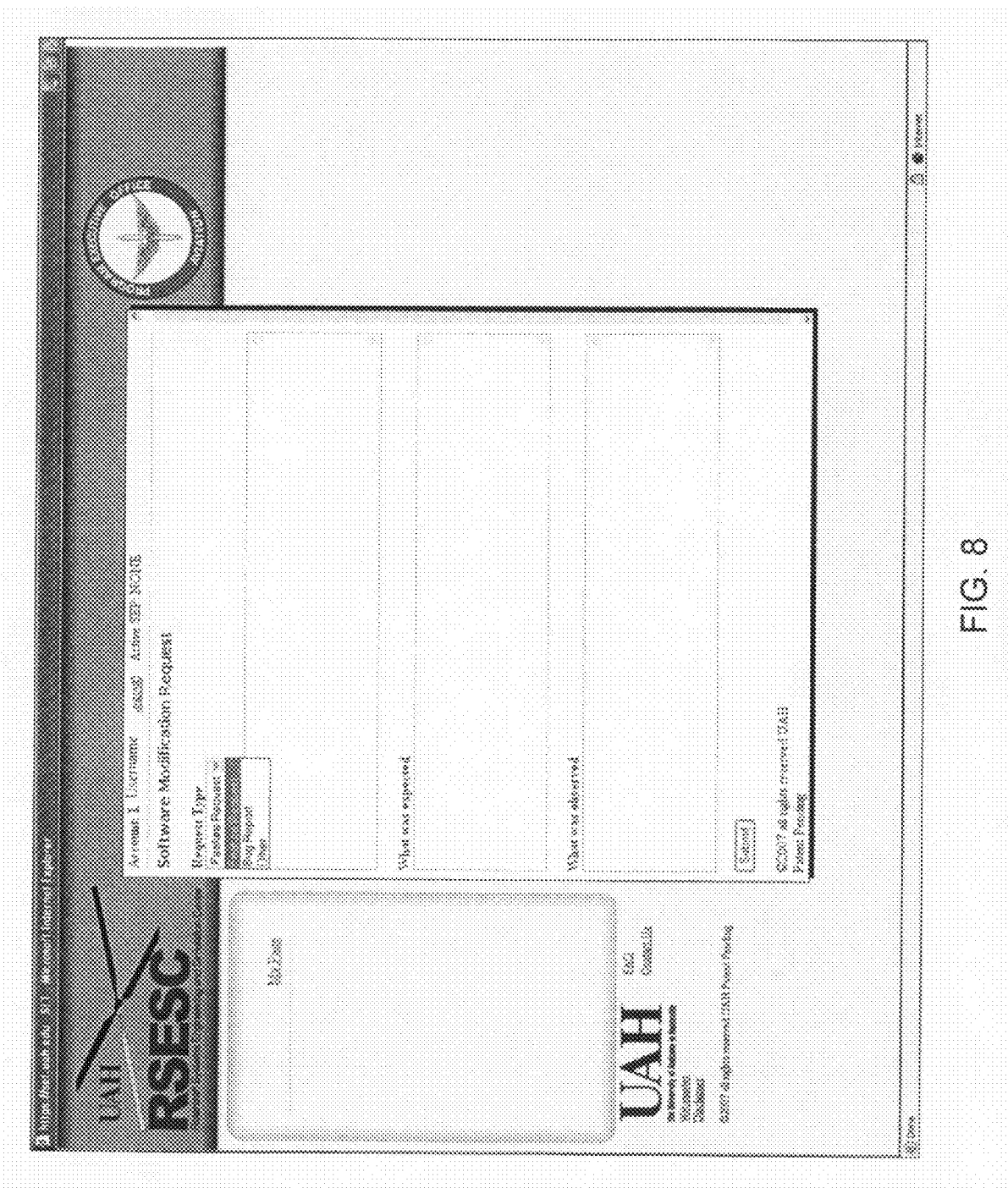
FIG. 8 is a screen shot of a Software Modification Request screen presented to a user in an exemplary embodiment of the present invention.

Users can submit requests to modify processor 14 using system 10. This is accomplished in one embodiment by clicking on a "File a software modification request" link displayed to users (FIG. 7). An example of the screen generated by system 10 when this link is clicked is shown in FIG. 8. As shown in this figure, users can request the addition of features (Feature Request) or the correction of bugs (Bug Report). Users can also submit other requests using the "Other" request type.

Figure 9:
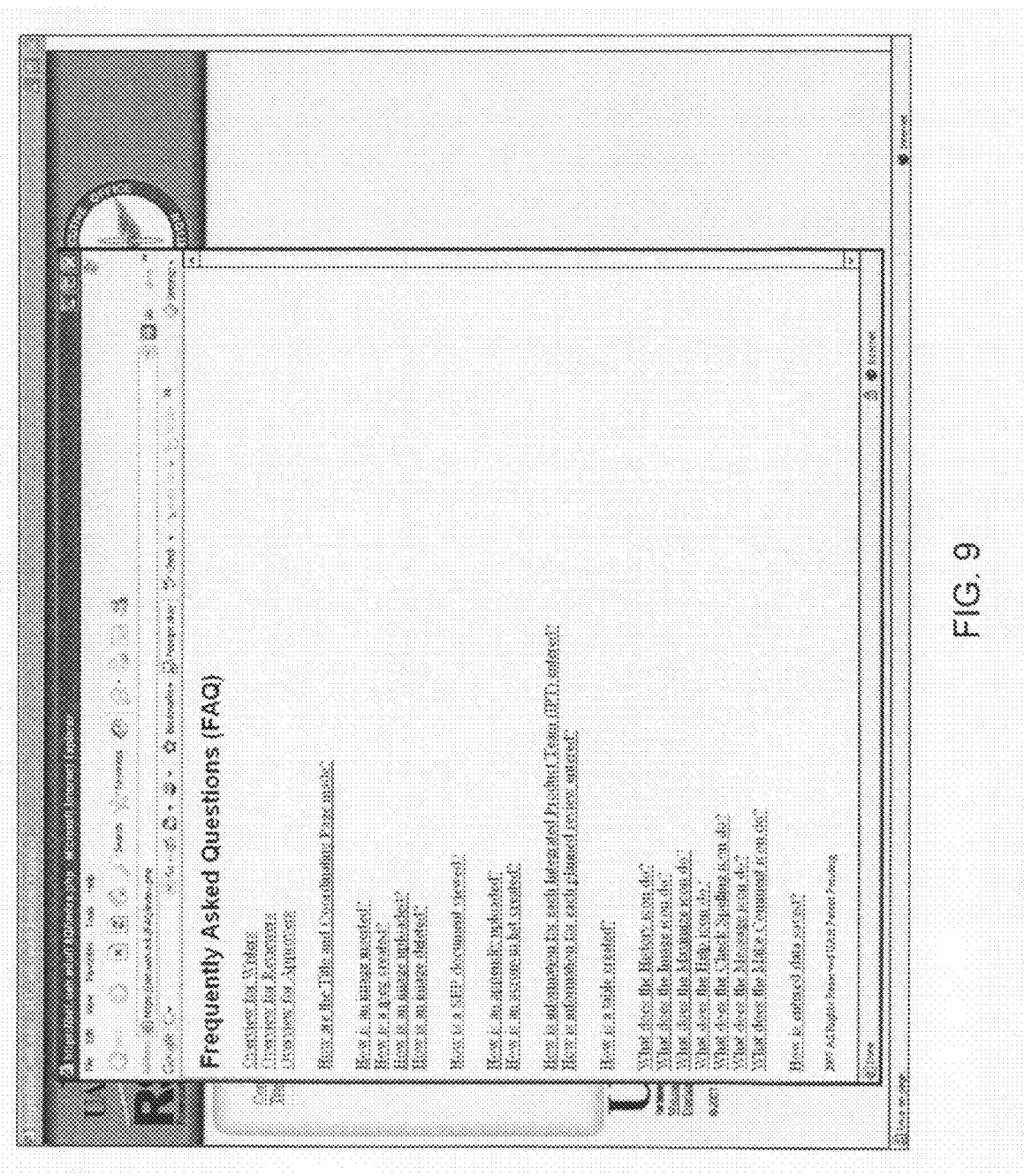
FIG. 9 is a screen shot of a Frequently Asked Questions screen presented to a user in an exemplary embodiment of the present invention.

Processor 14 allows users to view a list of frequently asked questions regarding system 10. In one embodiment, this is accomplished by clicking on a "FAQ" link (FIG. 5). When users click on this link, processor 14 displays the screen shown in FIG. 9, which, in turn, includes links to various topics relating to the use of system 10.

Processor 14 allows users to perform different types of functions depending on the user's permission levels with respect to a particular technical document. For example, reader designated users can view, delete, and reply to email messages from other users, review changes made to sections of technical documents the user is authorized to read, and generate current and working copy versions of these documents.

Figure 10:
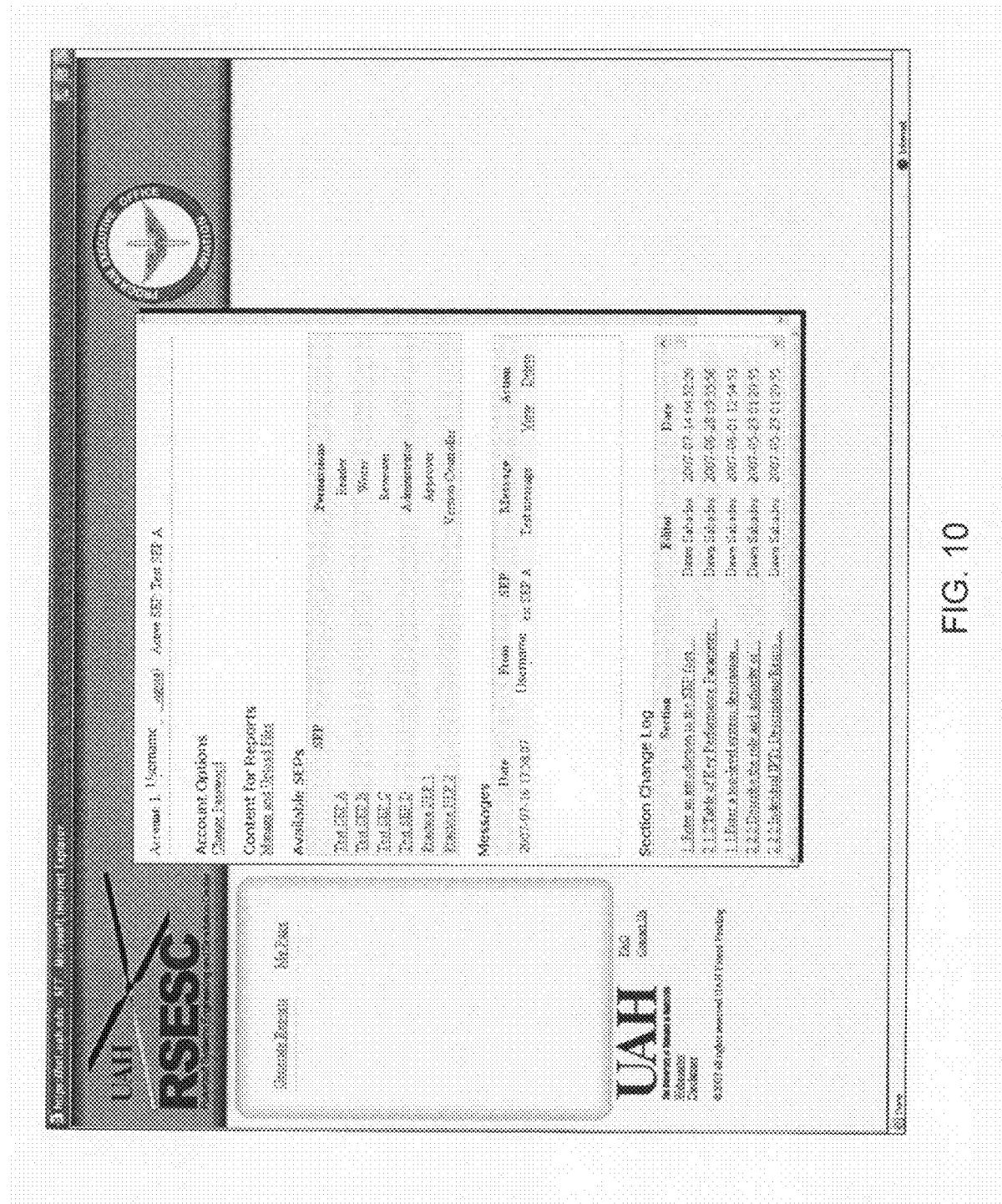
FIG. 10 is a screen shot of a My Page screen presented to a user having Reader permissions in an exemplary embodiment of the present invention.
Figure 11:
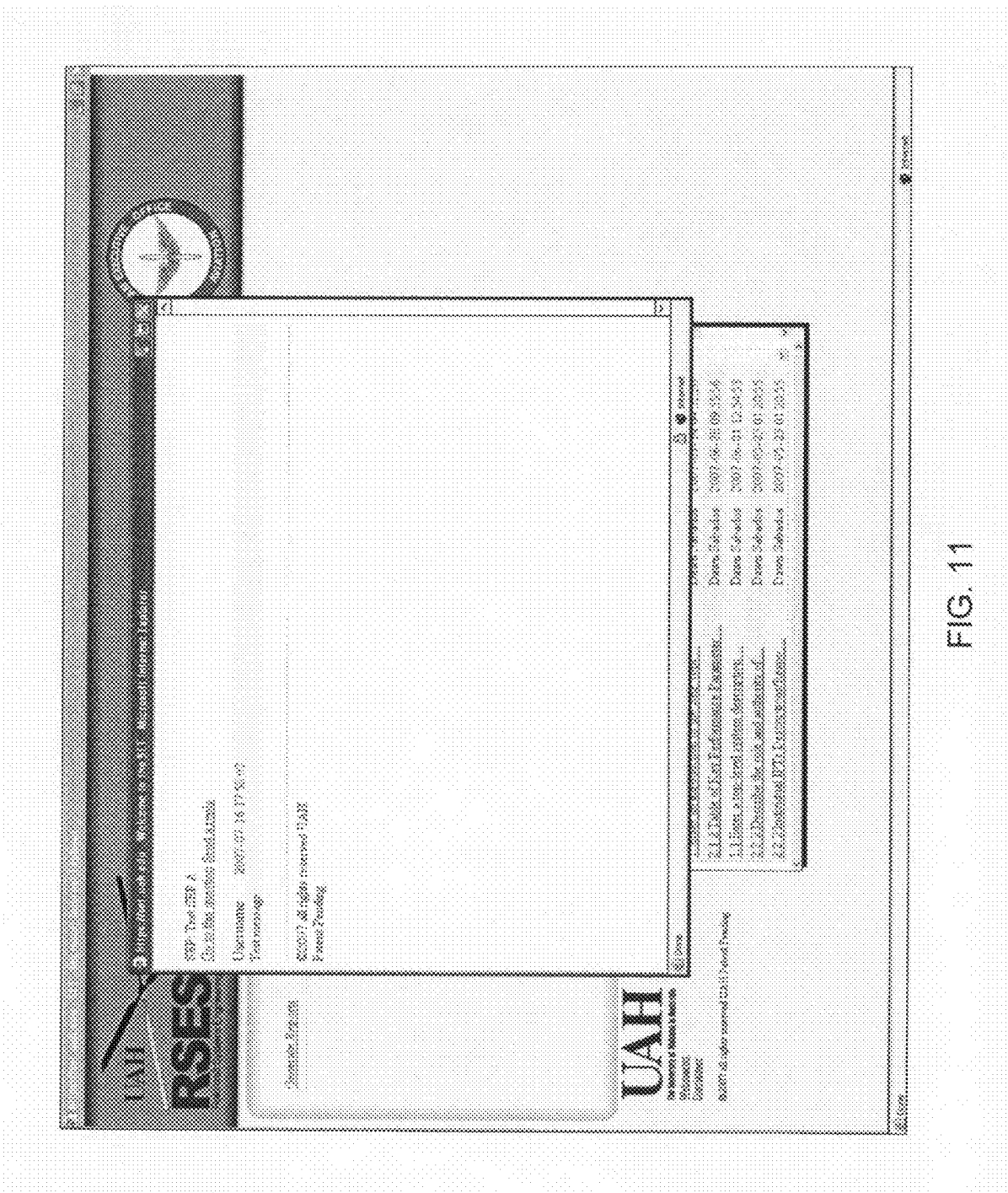
FIG. 11 is a screen shot of a View Email Message screen showing an email presented to a user in an exemplary embodiment of the present invention.

In one embodiment, this is accomplished using the screen shown in FIG. 10, which includes a "Messages" section, a "Section Change Log" section, and a "Generate Reports" link. Users view and delete emails by clicking on the "View" and "Delete" links in the "Messages" section. The screen generated by processor 14 when a user clicks on the "View" link for an email is shown in FIG. 11 and includes a "Send a reply" link that allows the user to reply to the email. This screen also includes a "Go to this question" link that allows the user to review the portion of the technical document associated with the email.

The "Section Change Log" section includes links to sections (under the "Section" heading" in FIG. 10) in the technical document identified at the top of the screen beside the "Active SEP:" line, which in this case is Test SEP A. Processor 14 displays the screen shown in FIG. 12 when the first link in this section is clicked by a user. Similar screens (not shown) are generated when the other links in this section are clicked by a user.

Figure 12:
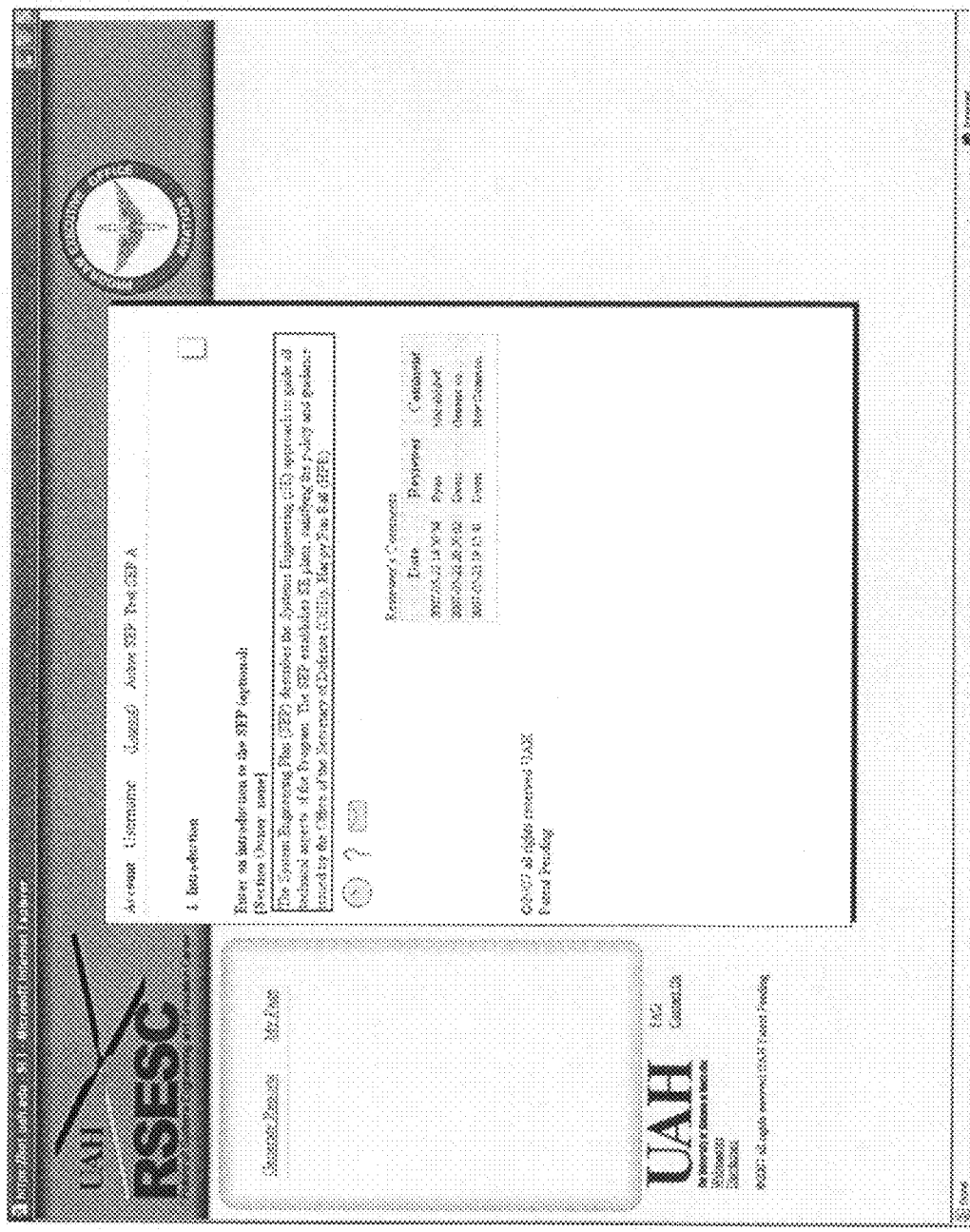
FIG. 12 is a screen shot of an Introduction screen presented to a Reader user in an exemplary embodiment of the present invention.

The screen in FIG. 12 includes the section heading for the section being read, which in this case is the "Introduction" section, the instructions and/questions relating to the section, which provide users with guidance with regard to the appropriate information to include in the section, a block showing the information currently included in this section, and a block including links to reviewer's comments relating to the section. Clicking on the links causes processor 14 to generate screens (not shown) showing the reviewer's comments.

Figure 13:
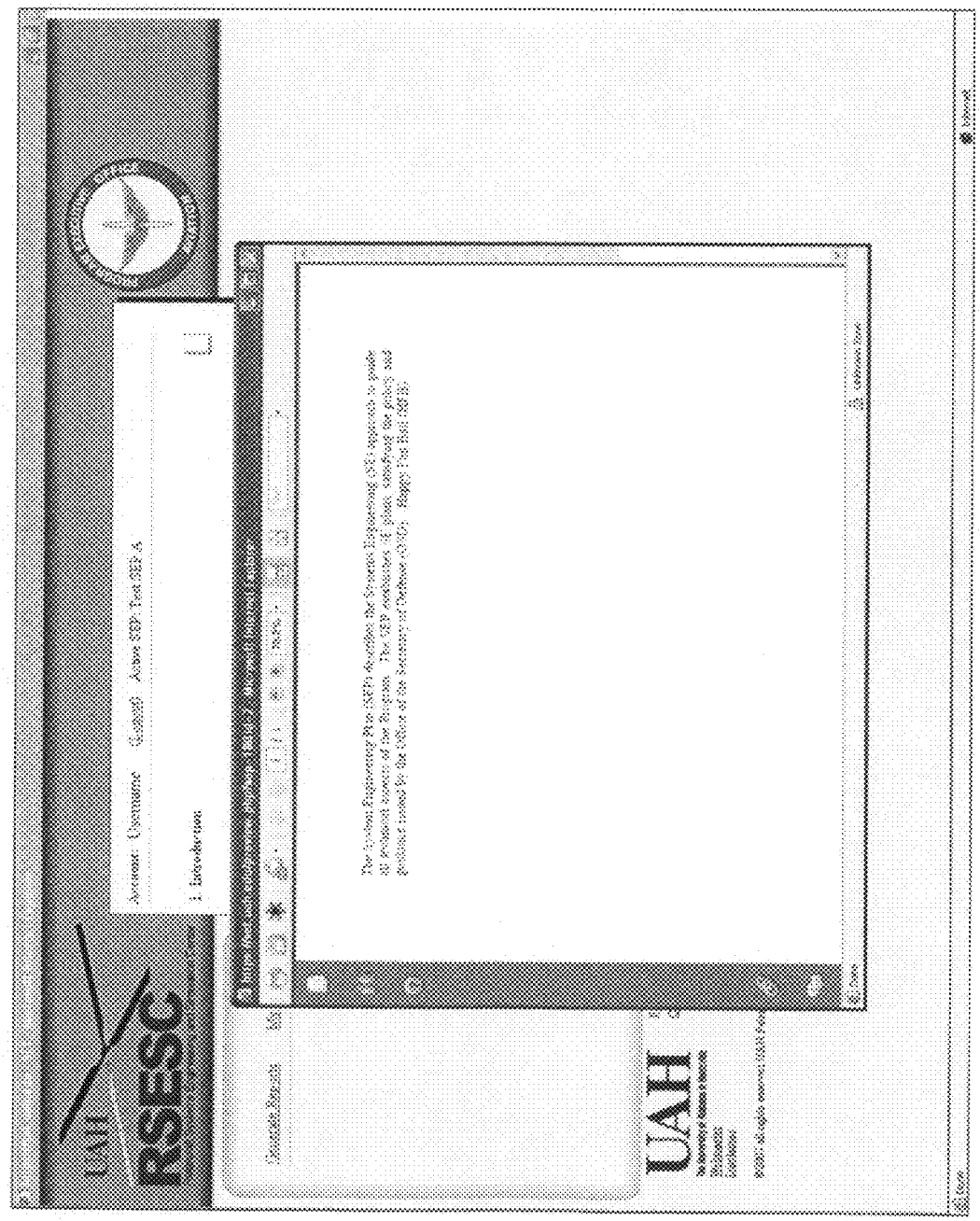
FIG. 13 is a screen shot of a Preview screen presented to a user in an exemplary embodiment of the present invention.
Figure 14:
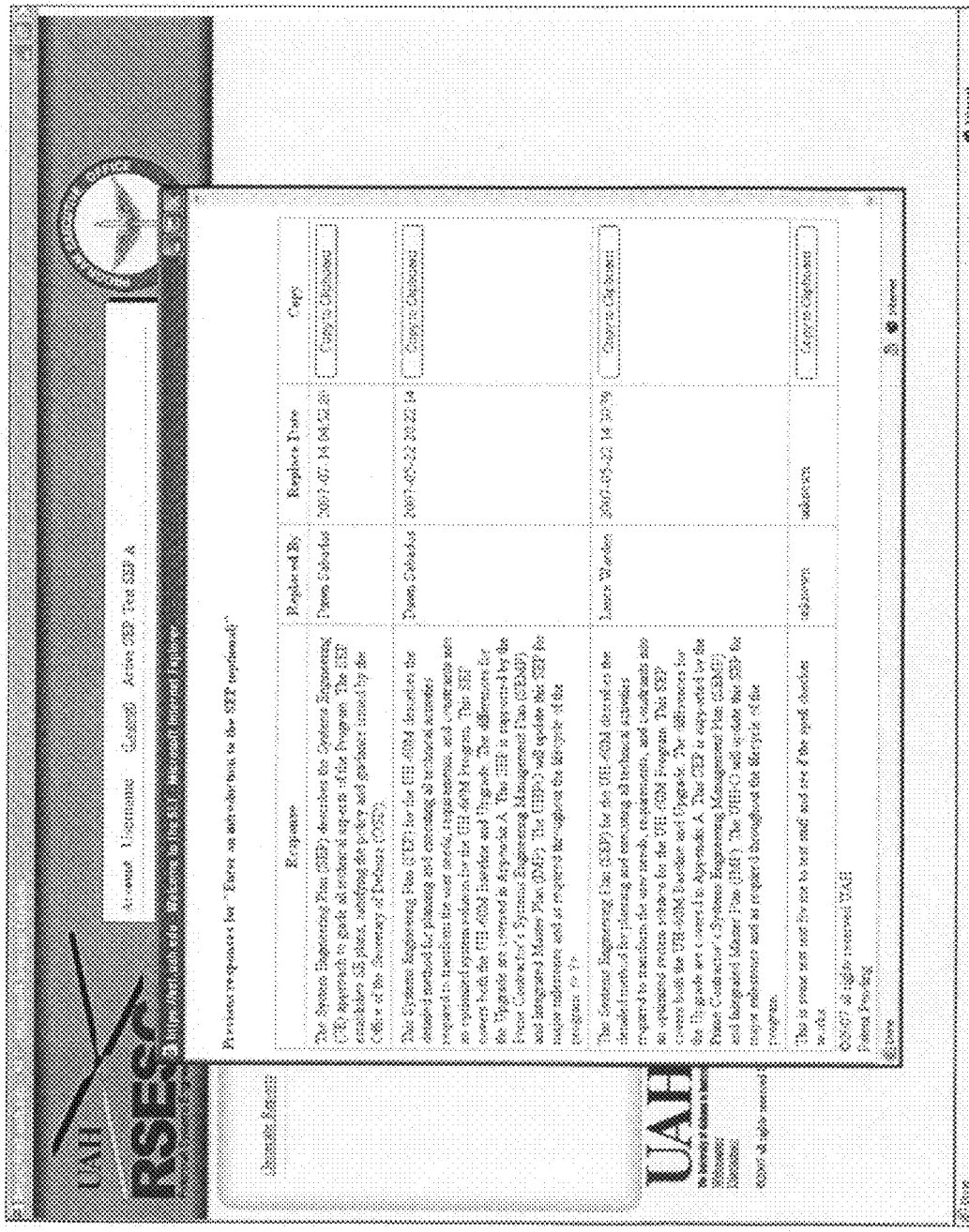
FIG. 14 is a screen shot of a History screen presented to a user in an exemplary embodiment of the present invention.

The screen also includes four (4) icons: a preview icon (located to the right of the section heading), a clock (or history) icon, and question mark (or help) icon, and an envelope (or email) icon. Clicking on the preview icon causes processor 14 to generate a preview of the information currently included in this section (FIG. 13). Clicking on the clock icon causes processor 14 to generate a listing of previous versions of information included in the "Introduction" section (FIG. 14). The listing includes information regarding the users who replaced a previous version of the information, the date the replacements occurred, and "Copy to Clipboard" buttons that allows users to copy previous versions of information to the clipboard and then paste them back into the section.

Figure 15:
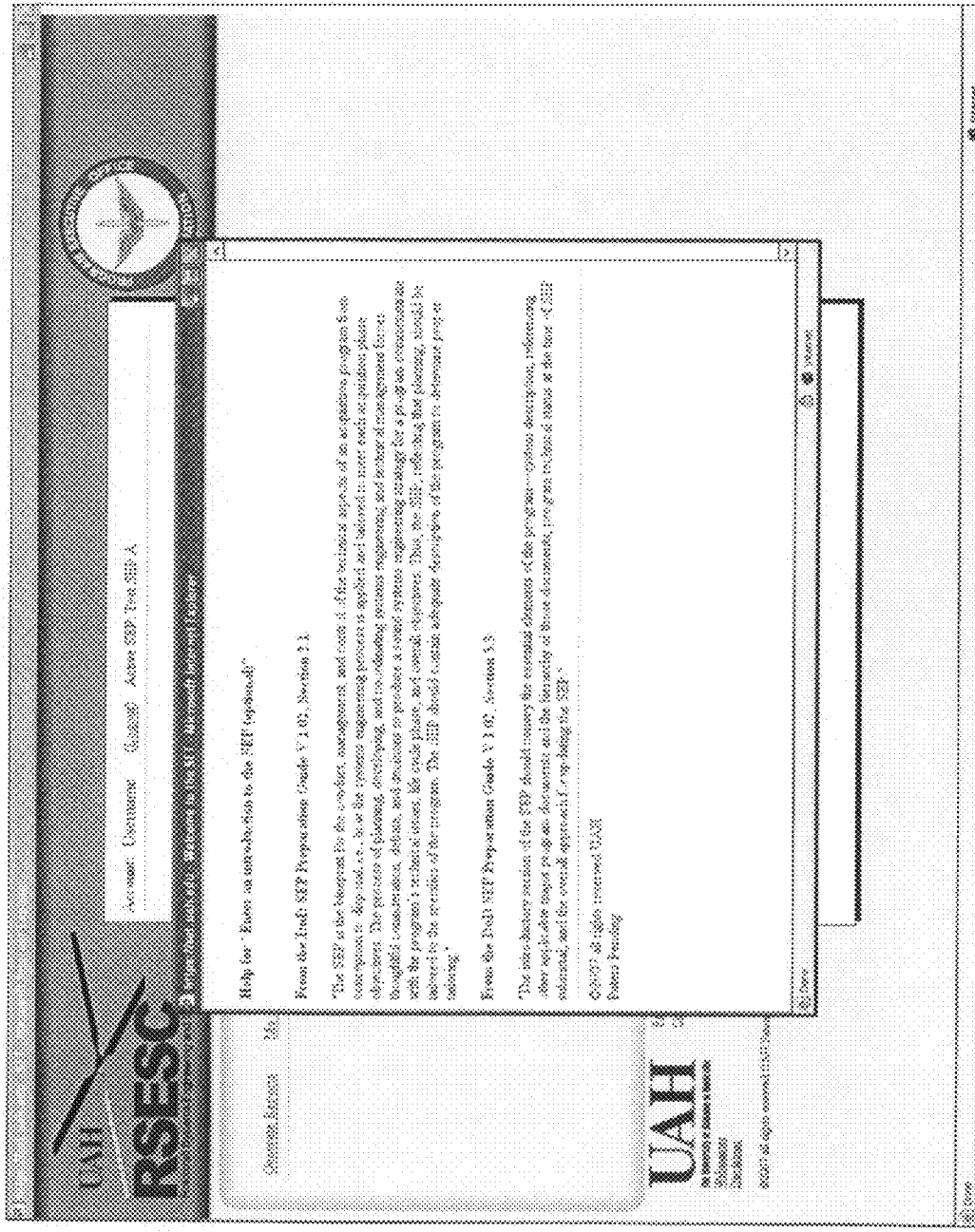
FIG. 15 is a screen shot of a Help screen presented to a user in an exemplary embodiment of the present invention.
Figure 16:
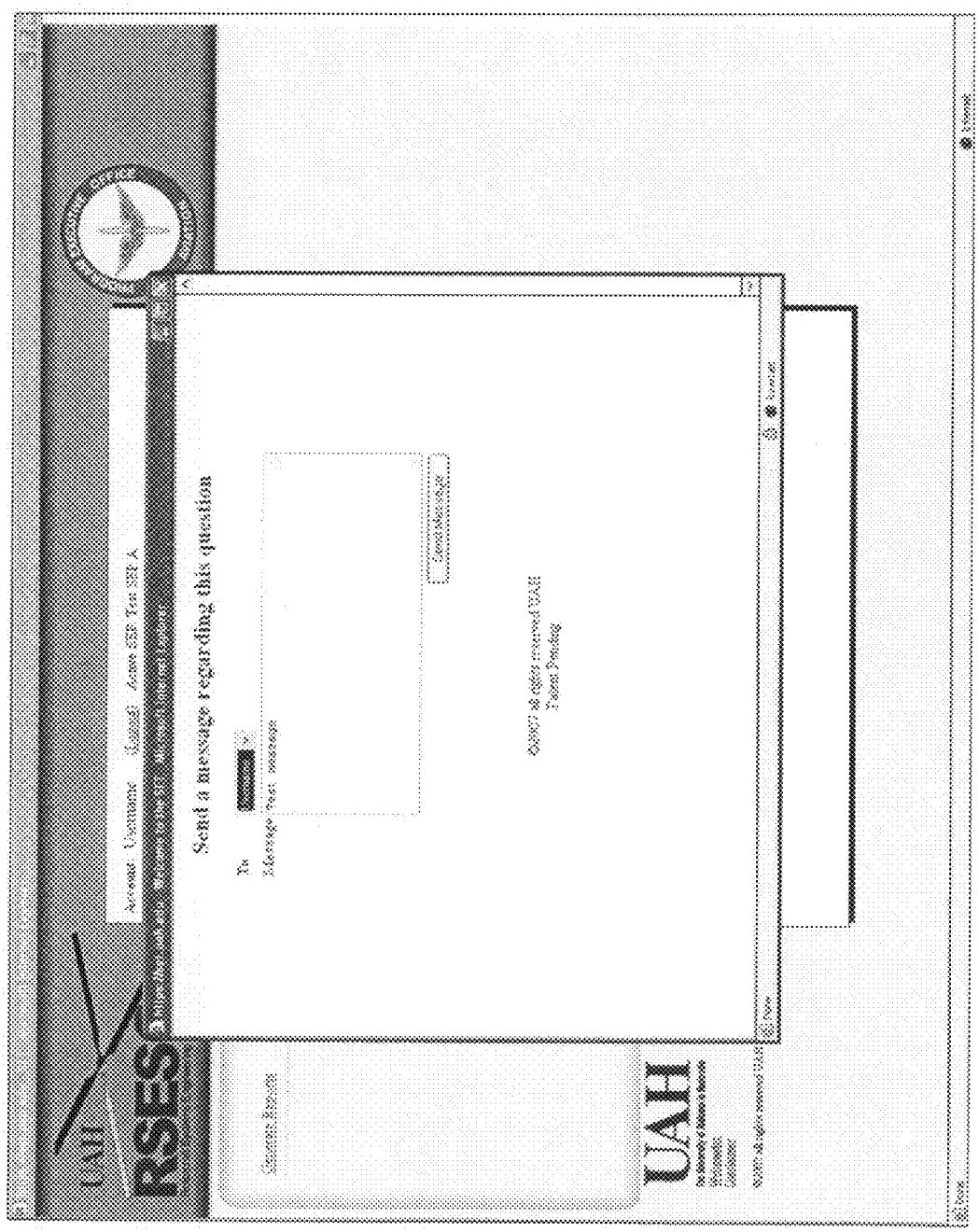
FIG. 16 is a screen shot of a Send Message screen presented to a user in an exemplary embodiment of the present invention.

Processor 14 generates information regarding the type of information to include in the section when users click on the question mark icon (FIG. 15). Clicking on the envelope icon allows users to send email messages to other users. An example of a screen generated by processor 14 that can be used to send emails is shown in FIG. 16.

Figure 17:
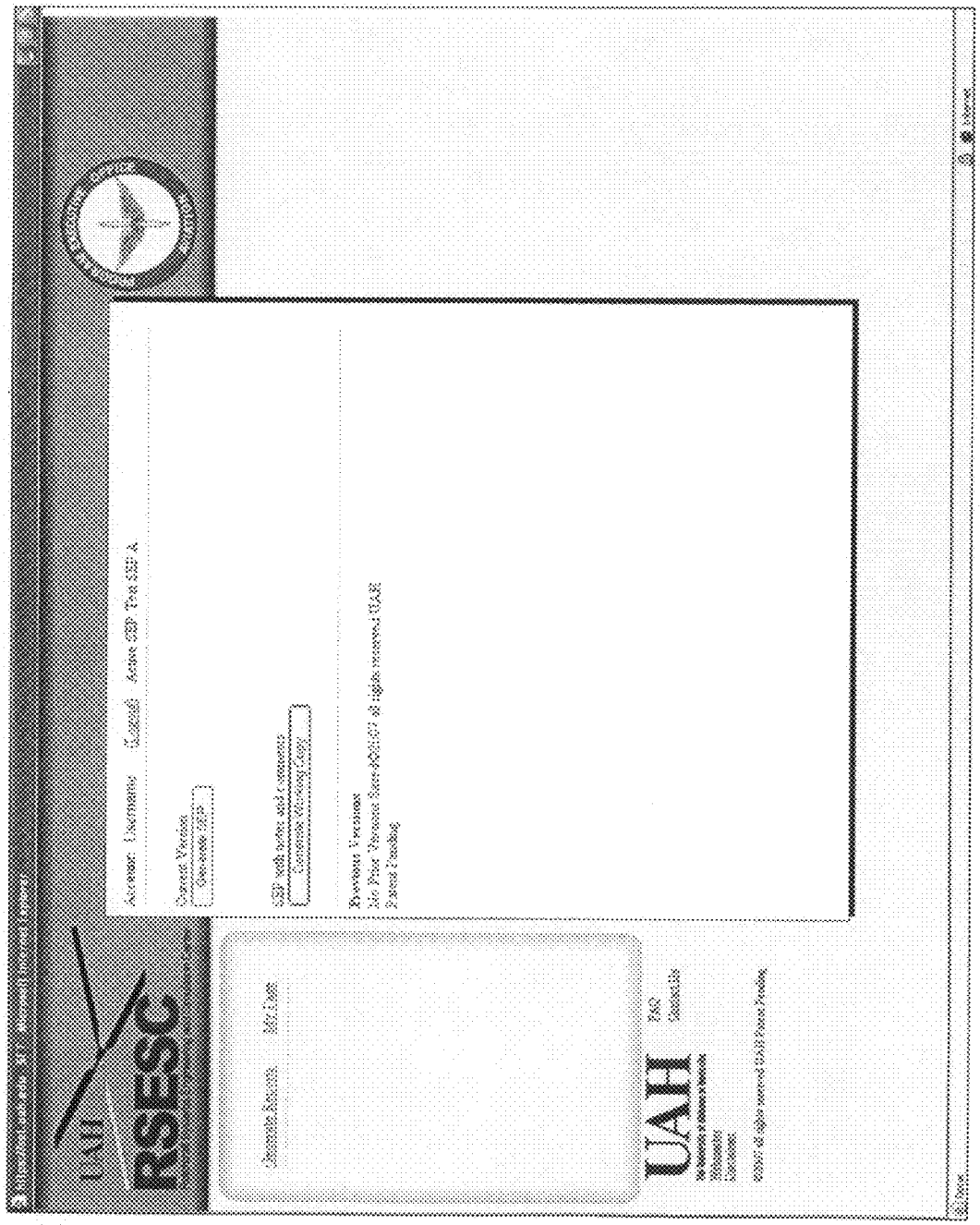
FIG. 17 is a screen shot of a Generate Reports screen presented to a user in an exemplary embodiment of the present invention.

The screen generated by processor 14 when a user clicks on the "Generate Reports" link is shown in FIG. 17 and includes a "Generate SEP" button and a "Generate Working Copy" button. Clicking on the "Generate SEP" button generates a .pdf version of the technical document identified at the top of the screen beside the "Active SEP:" line, which in this case is Test SEP A. Clicking on the "Generate Working Copy" button generates a .pdf version of a working copy of that document which includes notes from writers and comments from reviewers. Both of these versions can be downloaded to a client computer by clicking on a "Download SEP" link included in another screen (not shown) generated by processor 14.

Figure 18:
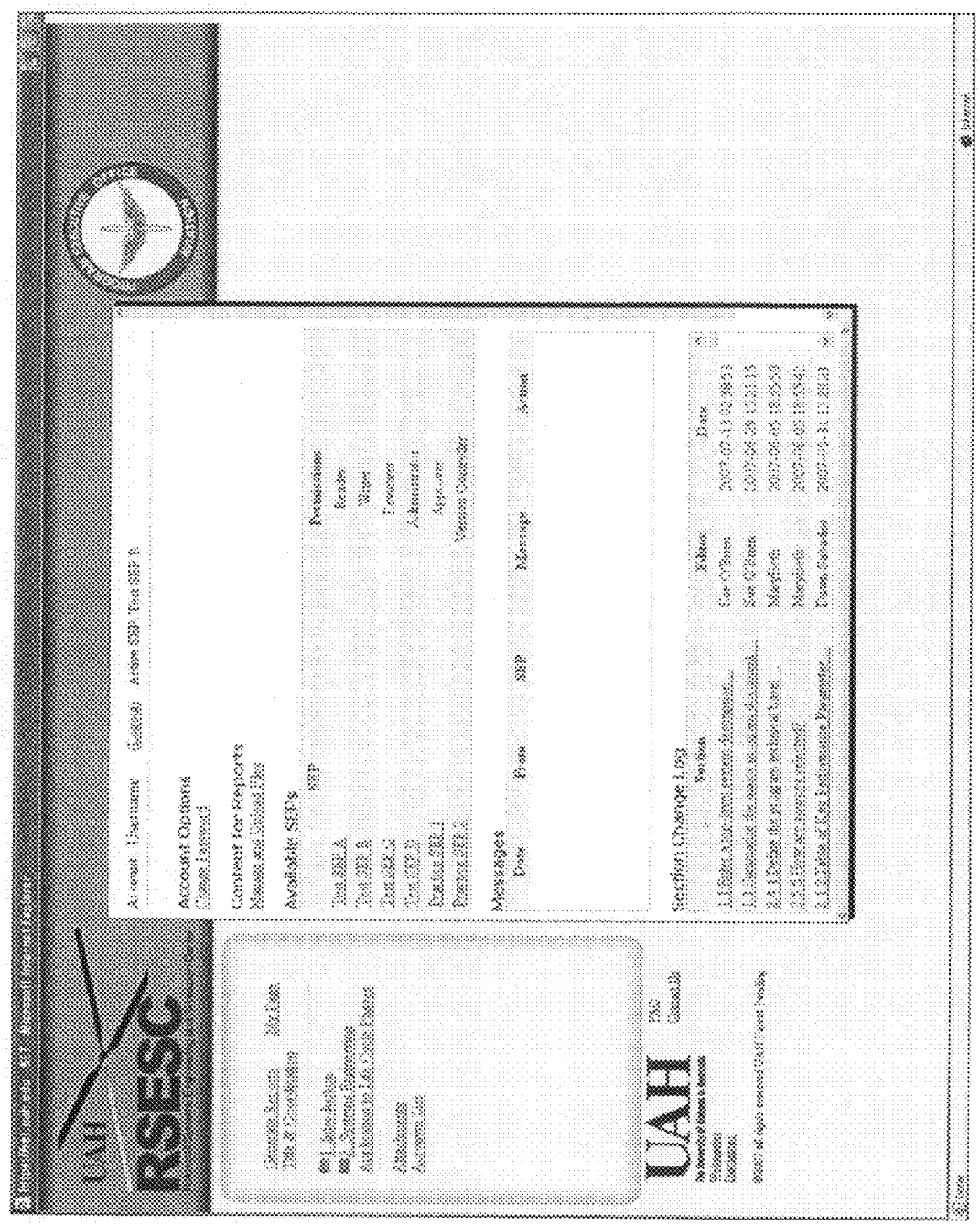
FIG. 18 is a screen shot of a My Page screen presented to a user having Writer permissions in an exemplary embodiment of the present invention.

Users designated as writers can perform the same functions discussed above with respect to readers. Writers can also enter title and coordination information for a technical document, information for the various sections of the technical document, upload attachments for the technical document, and generate an acronym list for the technical document. In one embodiment, this is accomplished using a screen (FIG. 18) generated by processor 14 that includes a "Title & Coordination" link, links for each section in the document, an "Attachment" link, and an "Acronym List" link. Clicking on the "Title & Coordination" link causes processor 14 to generate a screen (not shown) that allows a user to input a title and coordinating information for the technical document.

Section links include color coded folder and page icons (not shown). Clicking on a folder icon causes an expanded list of links with page icons to appear below the folder icon (e.g., section 1., which would include a folder icon, may have sub sections 1.1, 1.2, 1.3, etc., all of which would have page icons). Red colored folder and page icons indicate that a section is ready to be written or edited. If a section with red folder or page icon cannot be edited, the section is being viewed by another user. If this occurs, blue text showing the screen name of the user currently accessing the page will be displayed. Yellow colored folder and page icons indicate that a section has been submitted for review. Green colored folder and page icons indicate that a section has been accepted by all reviewers. When all section icons in a document are colored green, approvers are notified that the document is ready to be approved.

In one embodiment, processor 14 allows writers to enter various types of tables, including Integrated Product Team (IPT) tables, and planned review tables. Exemplary tables also include Change log tables, Tables of Key Performance Parameters, Tables of Statutory Requirements, Tables of Regulatory Requirements, and Tables of Certification Requirements. Processor 14 generates screens (not shown)

that allow users to enter text into tables, add table rows, and delete table rows. With respect to the Table of Key Performance Parameters, processor 14 automatically generates a list of questions for each key performance parameter (which are stored in database 12) when a user clicks on that parameter.

Clicking on one of the links for a section in the document causes processor 14 to generate a screen that can be used by a user to input information into that section. An example of one such screen is shown in FIG. 19.

Figure 19:
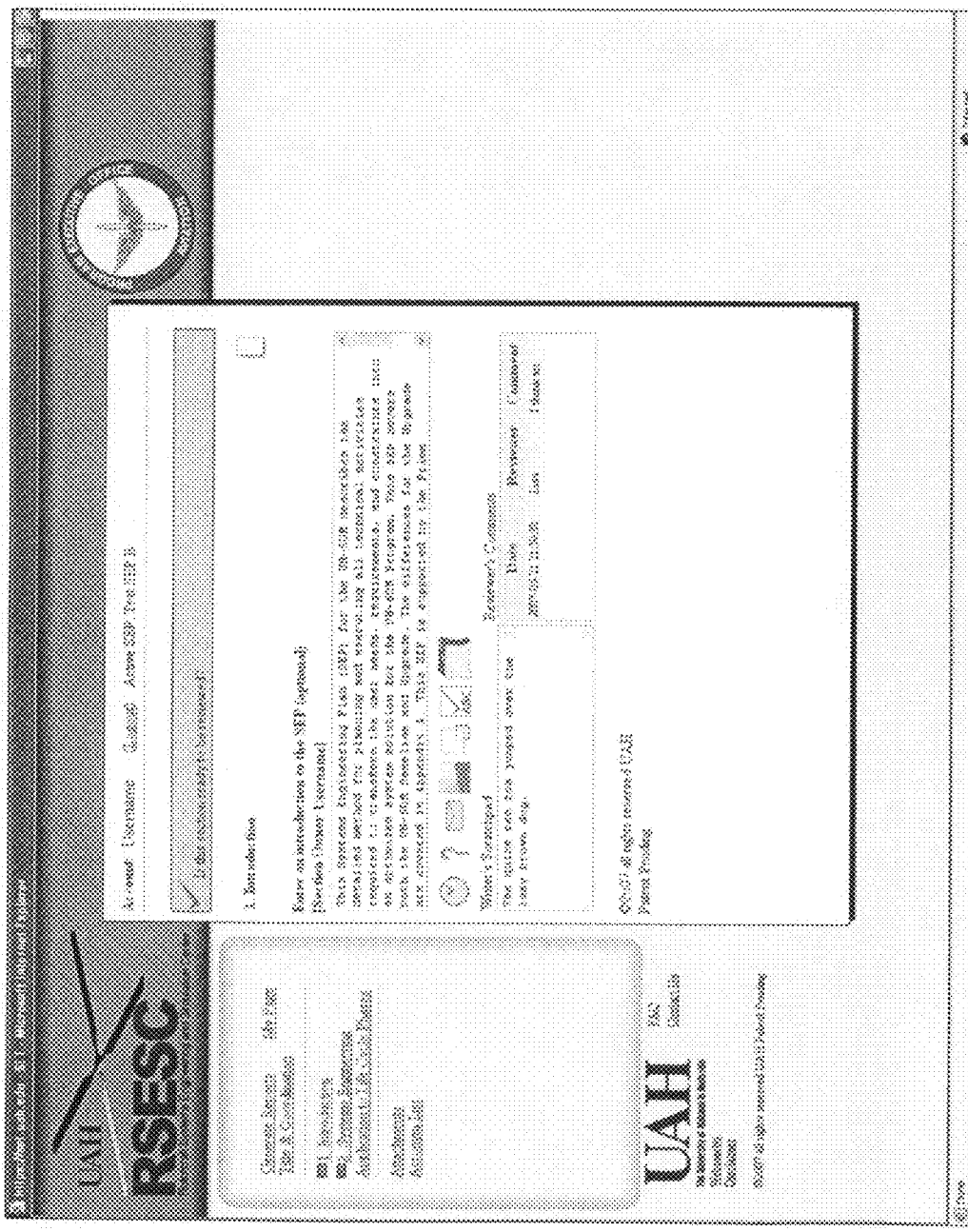
FIG. 19 is a screen shot of an Introduction screen presented to a Writer user in an exemplary embodiment of the present invention.

The screen in FIG. 19 includes preview, clock, question mark, and envelope icons discussed previously with respect to FIG. 12. These icons operate in the same manner as before and cause the generation of the screens shown in FIGS. 13-16. This screen includes the block containing reviewer's comments discussed previously with respect to FIG. 12, which can be used to review comments as indicated above.

The screen in FIG. 19 also includes image, maximize, spell check, and example icons, as well as a Writer's Scratchpad block. The Writer's Scratchpad block is used by writers to enter notes relating to the section. These notes appear in any working copy versions of the technical document that are generated by users.

Figure 20:
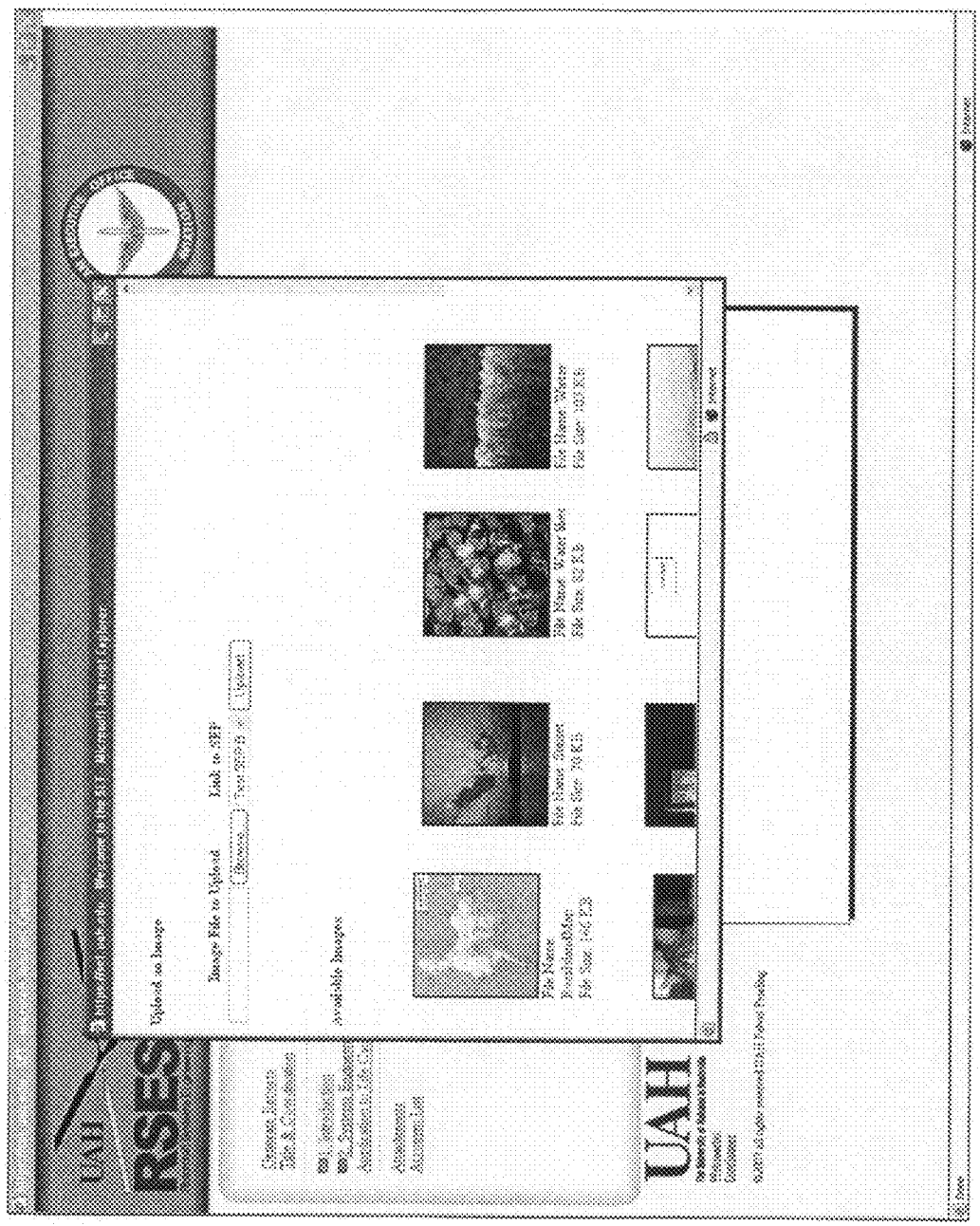
FIG. 20 is a screen shot of an Upload Image screen presented to a user in an exemplary embodiment of the present invention.

Clicking on the image icon allows a user to add an image to the section and, if a desired image is not available, to upload and add the desired image to the section. An example of the screen generated by processor 14 when the image icon is clicked is shown in FIG. 20. This screen allows a user to upload an image to system 10 as discussed previously with respect to FIG. 6 and includes a thumbnail listing of images that can be added to the section. Clicking on a thumbnail causes processor 14 to generate an enlarged view of the thumbnail (not shown). When a user selects an image to be added to the section, processor 14 also generates a screen (not shown) that prompts the user to enter a caption for the image. Figure numbers do not have to be added because processor 14 automatically generates these numbers.

Figure 21:
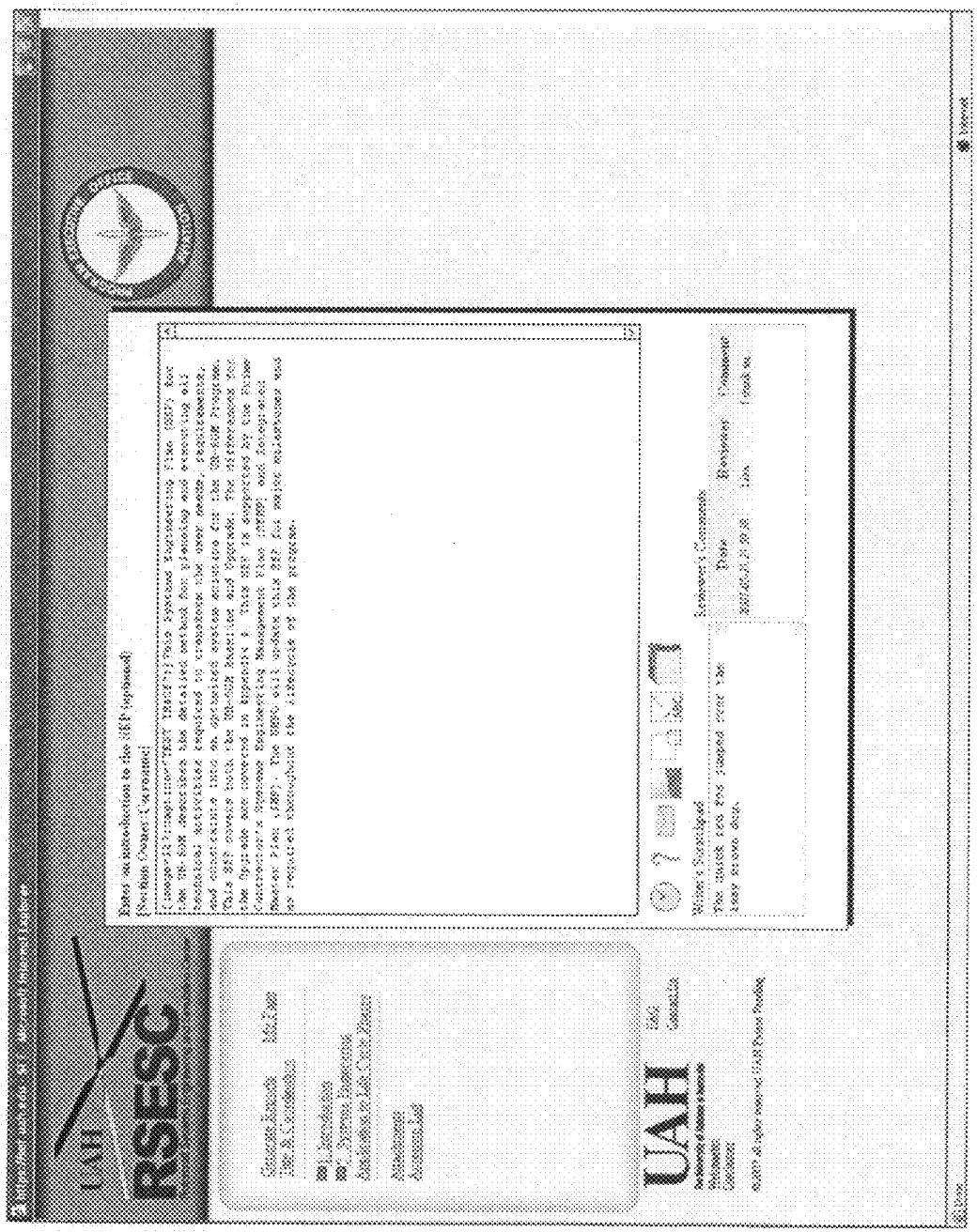
FIG. 21 is a screen shot of a Maximize screen presented to a user in an exemplary embodiment of the present invention.
Figure 22:
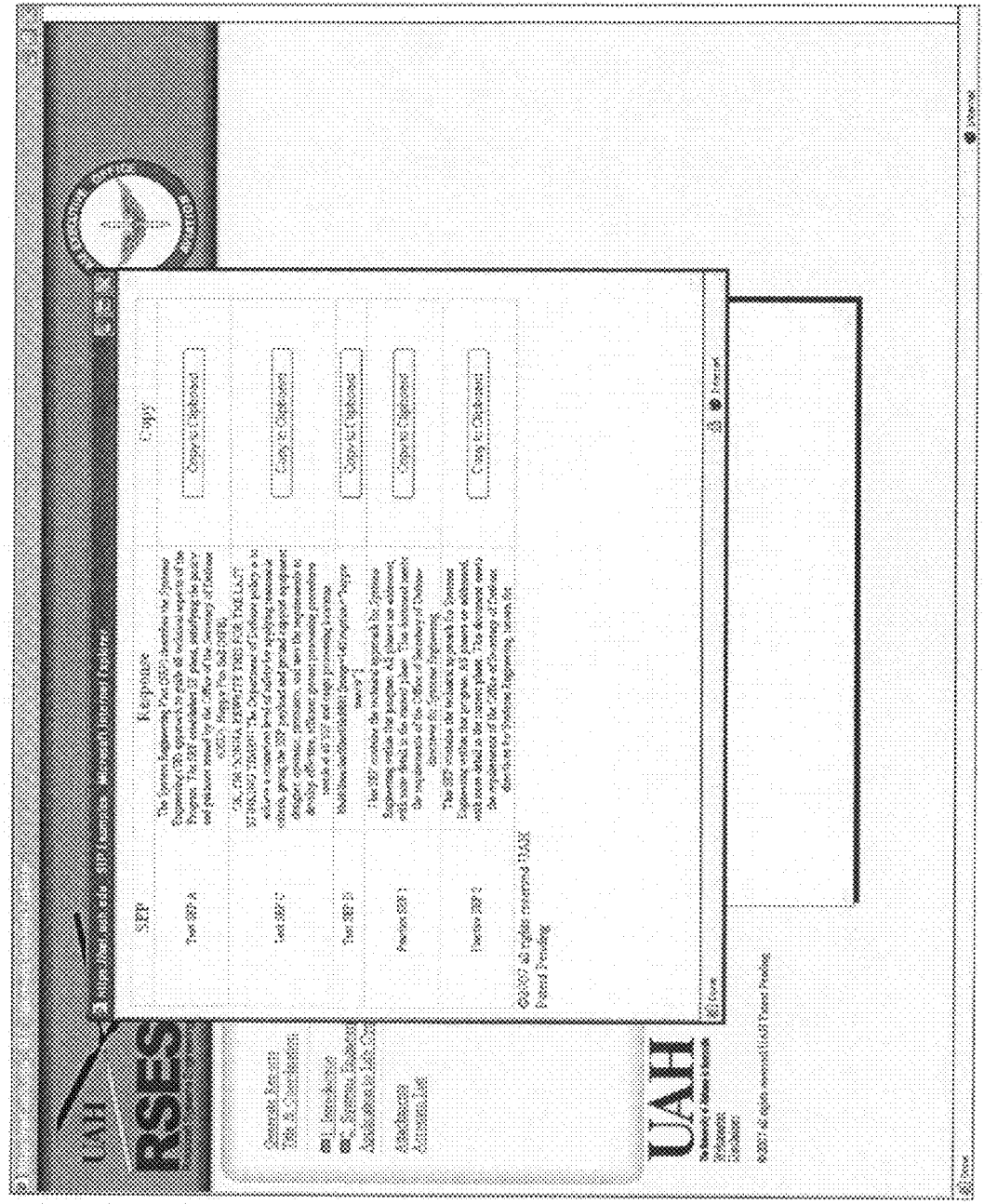
FIG. 22 is a screen shot of an Example screen presented to a user in an exemplary embodiment of the present invention.

Clicking on the maximum icon causes processor 14 to generate an enlarged view of the block user by a writer to enter information into a section. An example of such a view is shown in FIG. 21. Clicking on the spell check icon causes processor 14 to check the spelling of text included in the block used to enter information into a section. Any words not recognized by the software are highlighted (red in one embodiment) in another screen (not shown) generated by processor 14 and the user is prompted to correct the spelling using a drop down menu including a listing of alternative spellings. When the spelling has been corrected, the correctly spelled word is highlighted in blue. Clicking on the example icon causes processor 14 to generate a listing of examples of information included in sections of other technical documents the user is authorized to access. An example of a screen containing this information is shown in FIG. 22.

Figure 23:
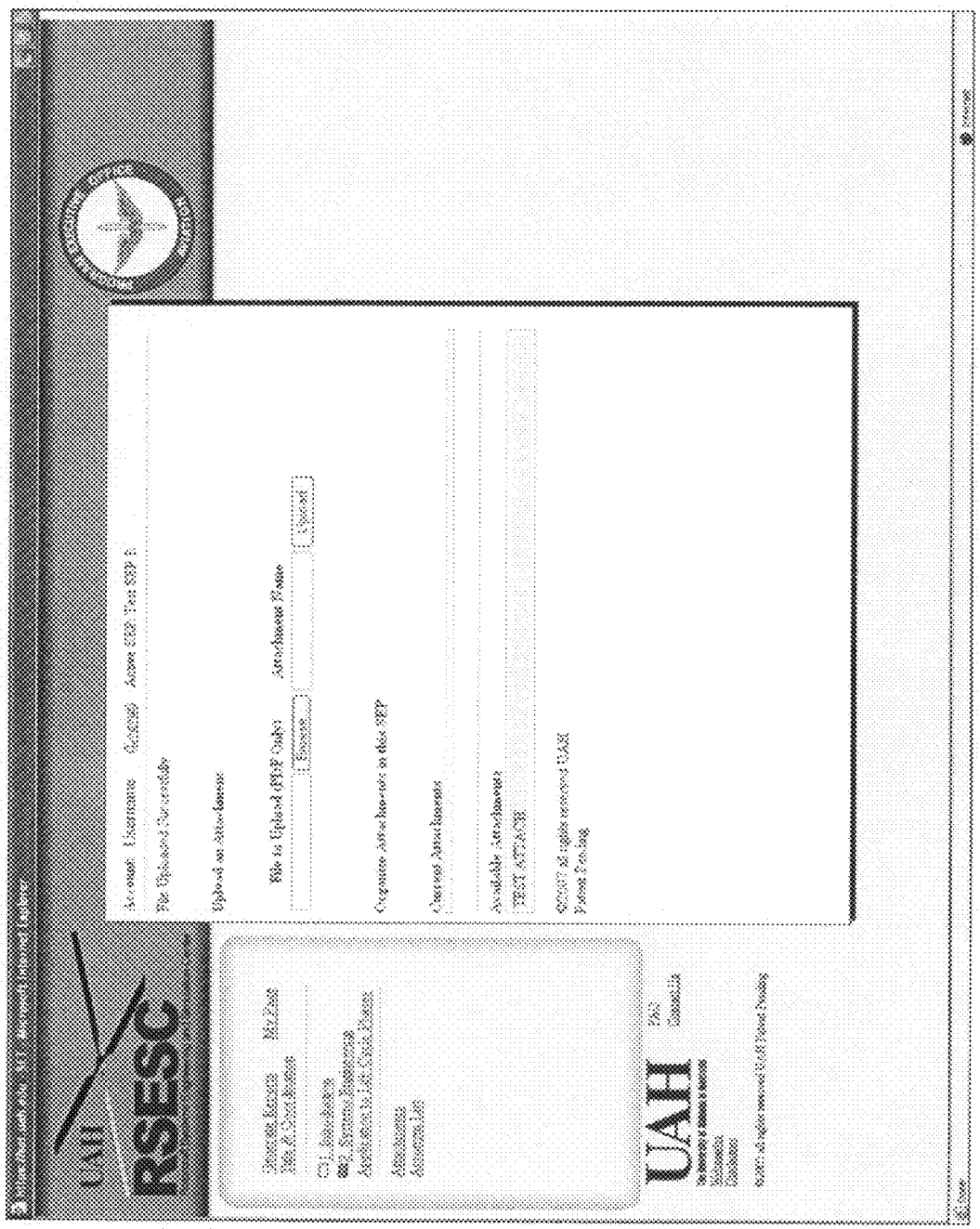
FIG. 23 is a screen shot of an Upload Attachment screen presented to a user in an exemplary embodiment of the present invention.

Clicking on the "Attachments" link allows users to add attachments to a technical document and clicking the "Acronym List" link allows users to generate acronym lists for documents. An example of a screen generated by processor 14 to add attachments is shown in FIG. 23. Attachments are added in a manner that is similar to the manner in which files and images are added. In one embodiment, attachments may be uploaded as .pdf files. Processor 14 automatically generates letter assignments for attachments as they are added to documents.

Figure 24:
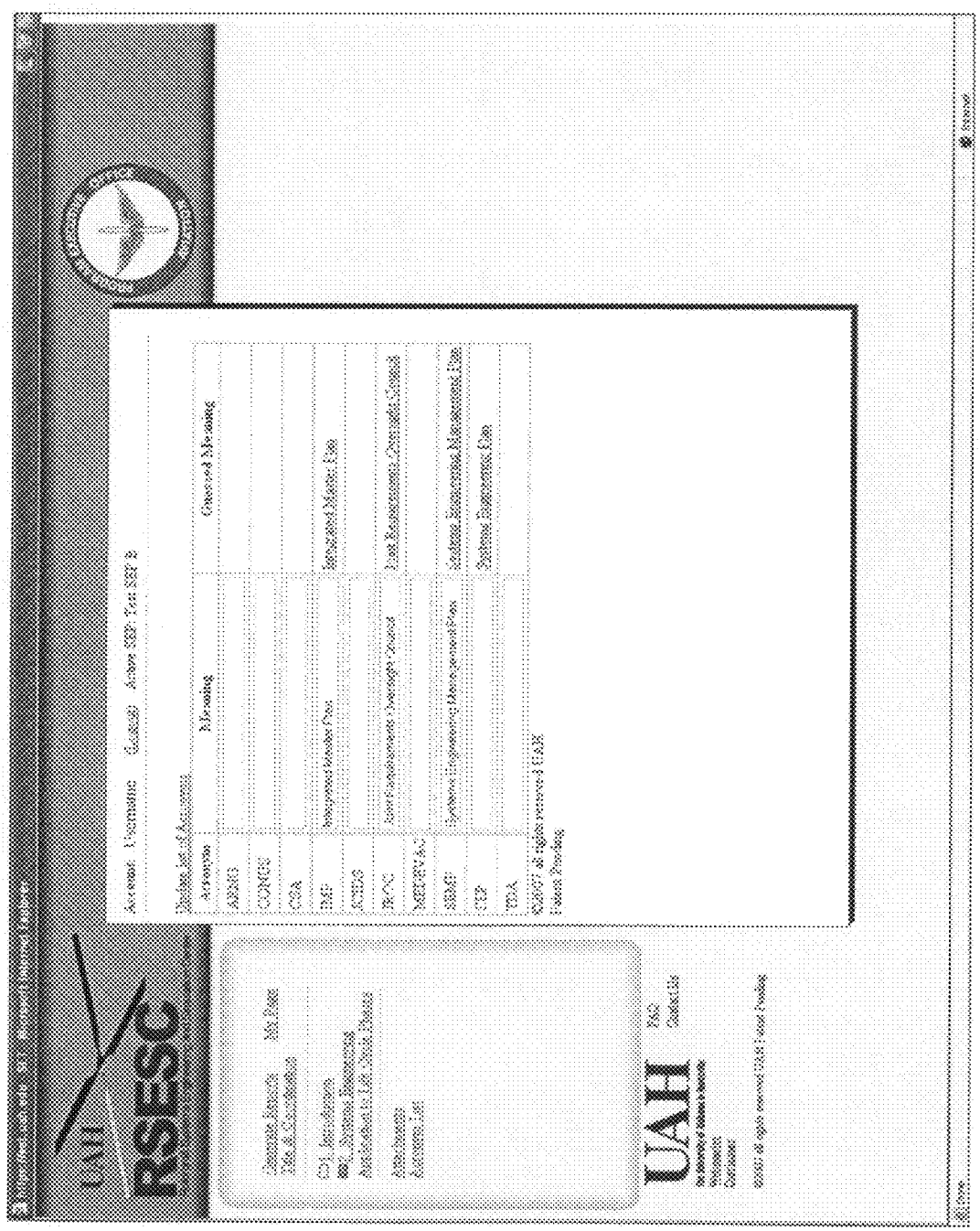
FIG. 24 is a screen shot of an Acronym List screen presented to a user in an exemplary embodiment of the present invention.

FIG. 24 includes a screen showing an acronym list generated by processor 14. As shown in this figure, the acronym list includes a listing of acronyms, the meanings of the acronyms, and, if the meaning is unknown, the guessed meaning generated by processor 14. Users can enter the correct meaning for an acronym and update the acronym list by clicking on the "Update list of Acronyms" link in FIG. 24.

When a section is complete, the writer submits the section for review by reviewers. Once this submission is made, the writer cannot make any further changes until the section is returned by a reviewer for additional work. In one embodiment, a section is completed by simply clicking on the "Is this section ready to be reviewed" portion of the screen shown in FIG. 19.

Figure 25:
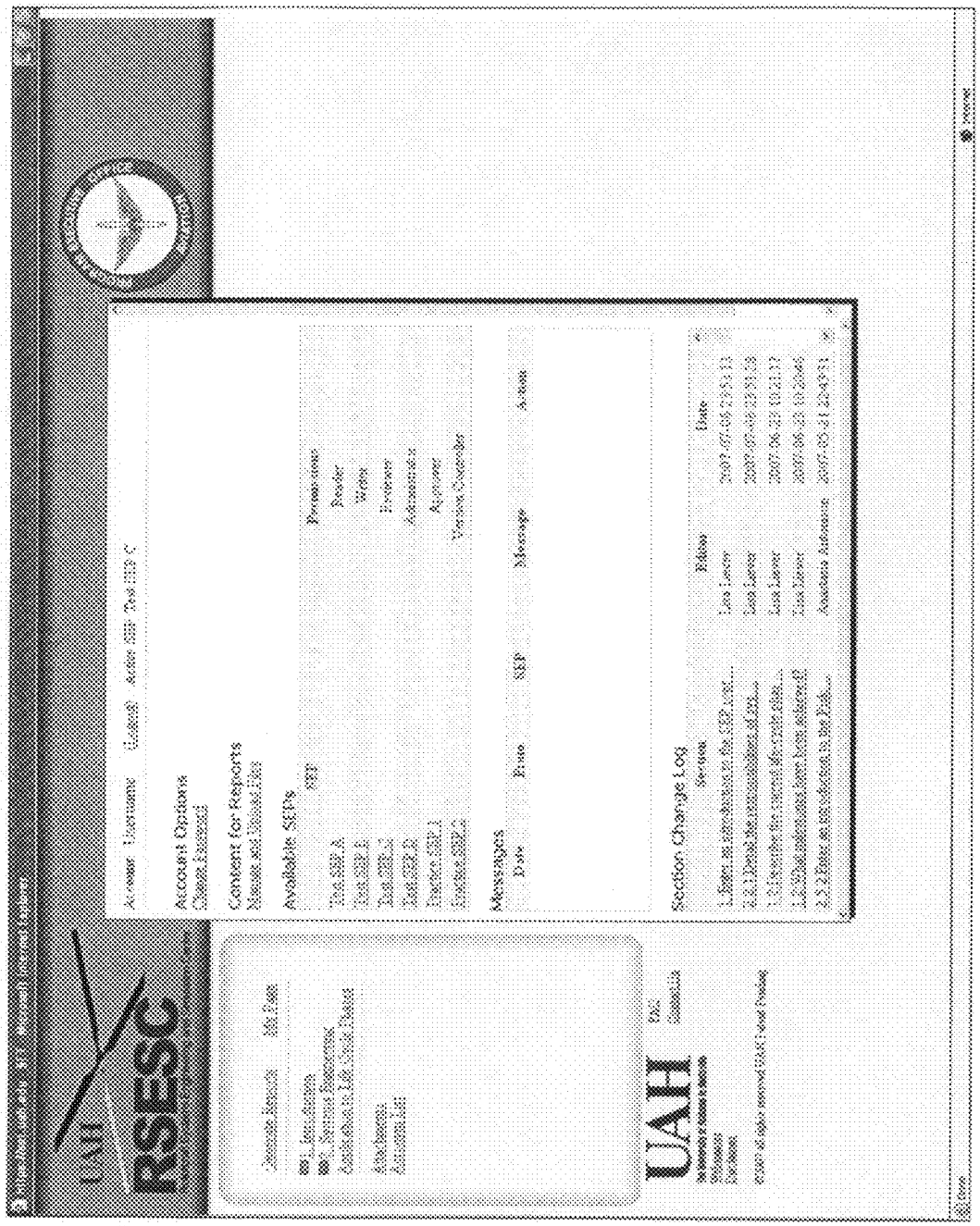
FIG. 25 is a screen shot of a My Page screen presented to a user having Reviewer permissions in an exemplary embodiment of the present invention.
Figure 26:
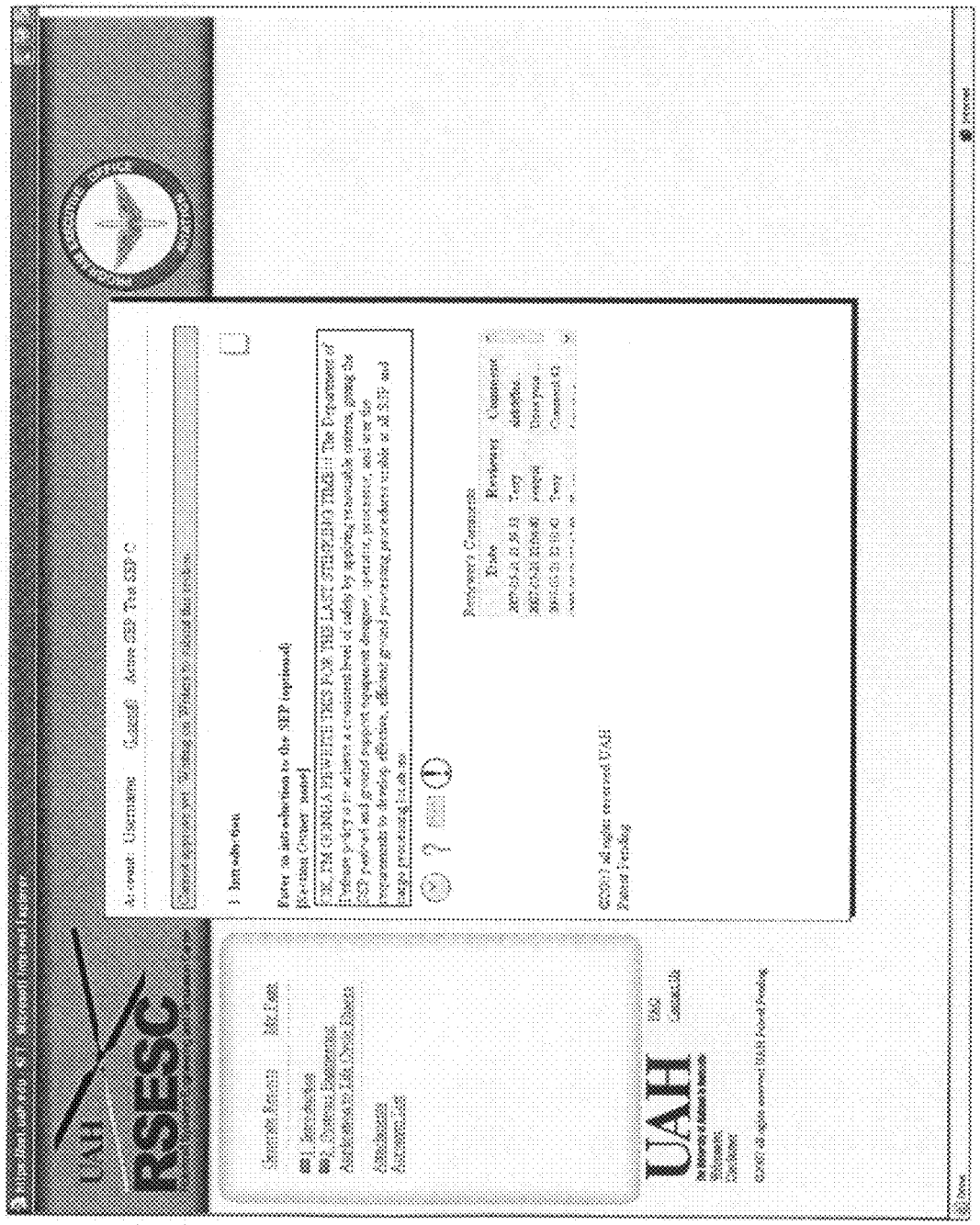
FIG. 26 is a screen shot of an Introduction screen presented to a user having Reviewer permissions in an exemplary embodiment of the present invention.
Figure 27:
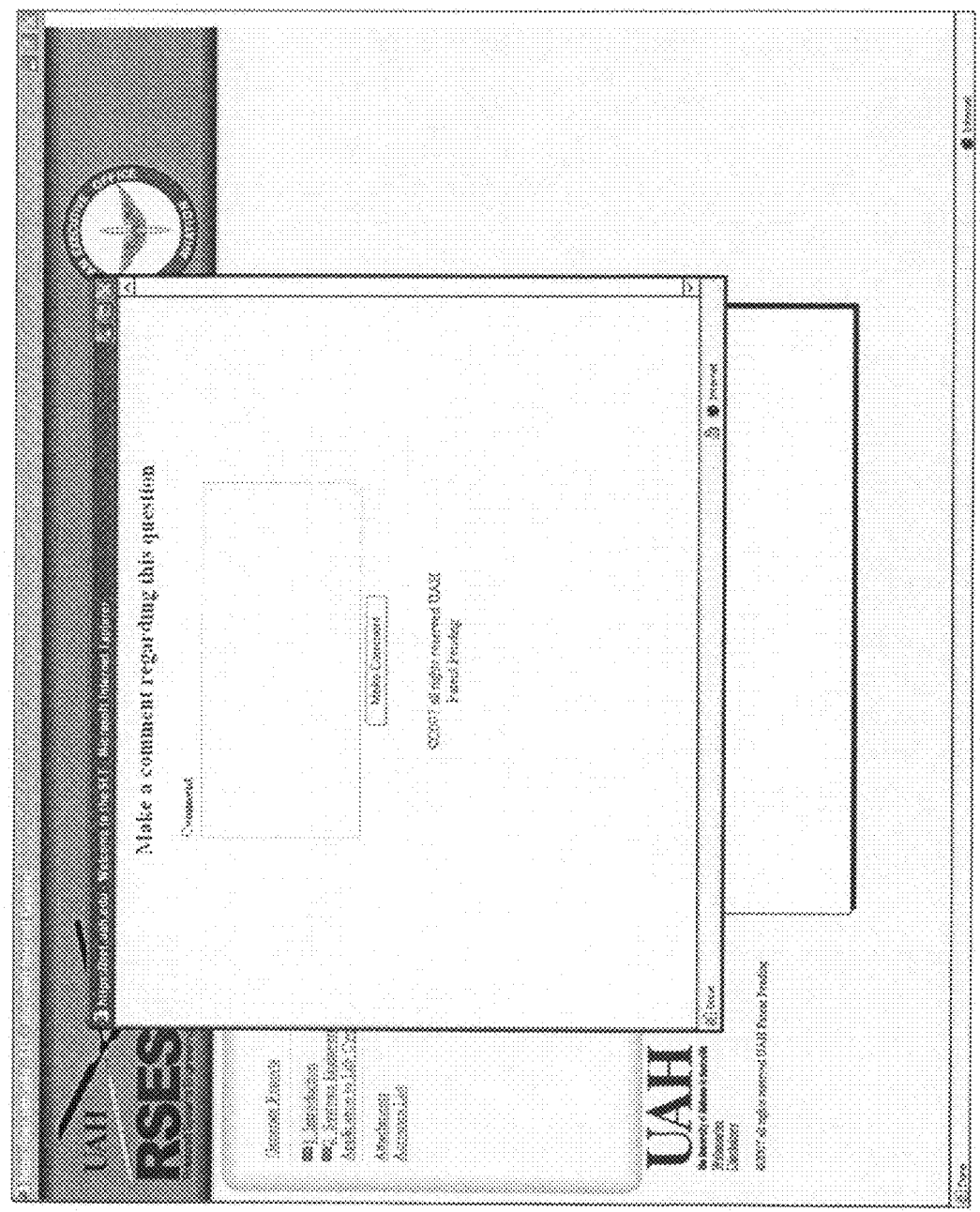
FIG. 27 is a screen shot of a Make Comment screen presented to a user having Reviewer permissions in an exemplary embodiment of the present invention.

Reviewers can also perform the same functions performed by readers. Reviewers, however, are also responsible for reviewing the various sections in a technical document and sending comments to writers when changes need to made to those sections. An example of a initial screen generated by processor 14 for a reviewer is shown in FIG. 25 and an example of a screen that can be used to submit comments relating to a section (in this case, the Introduction section) is shown in FIG. 26. Comments are submitted by clicking on the comment icon in FIG. 26, which is the explanation point enclosed by a circle. Clicking on this icon causes processor 14 to allow a reviewer to enter and send comments. An example of a screen generated by processor 14 for this purpose is shown in FIG. 27.

Figure 28:
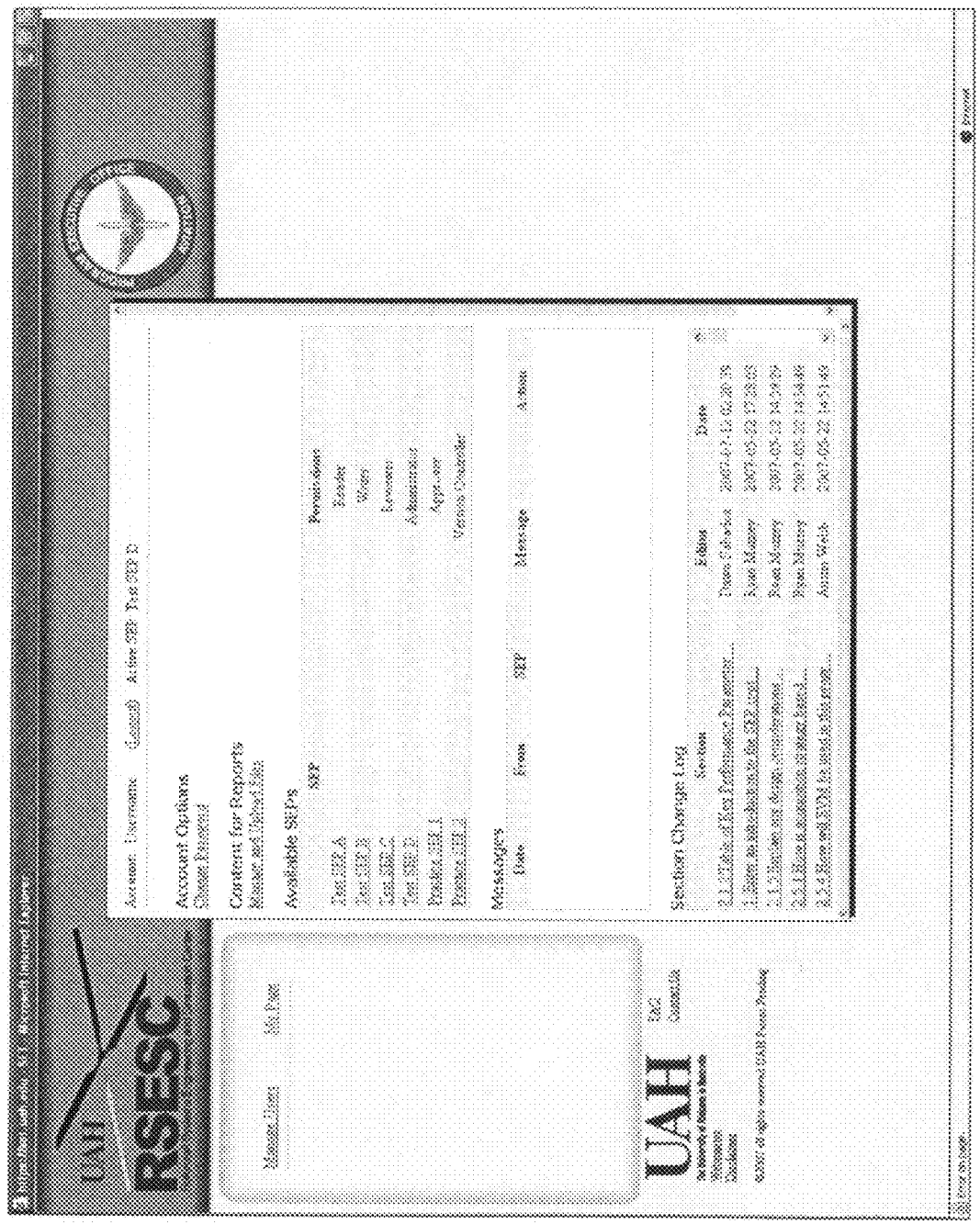
FIG. 28 is a screen shot of a My Page screen presented to a user having Administrator permissions in an exemplary embodiment of the present invention.
Figure 29:
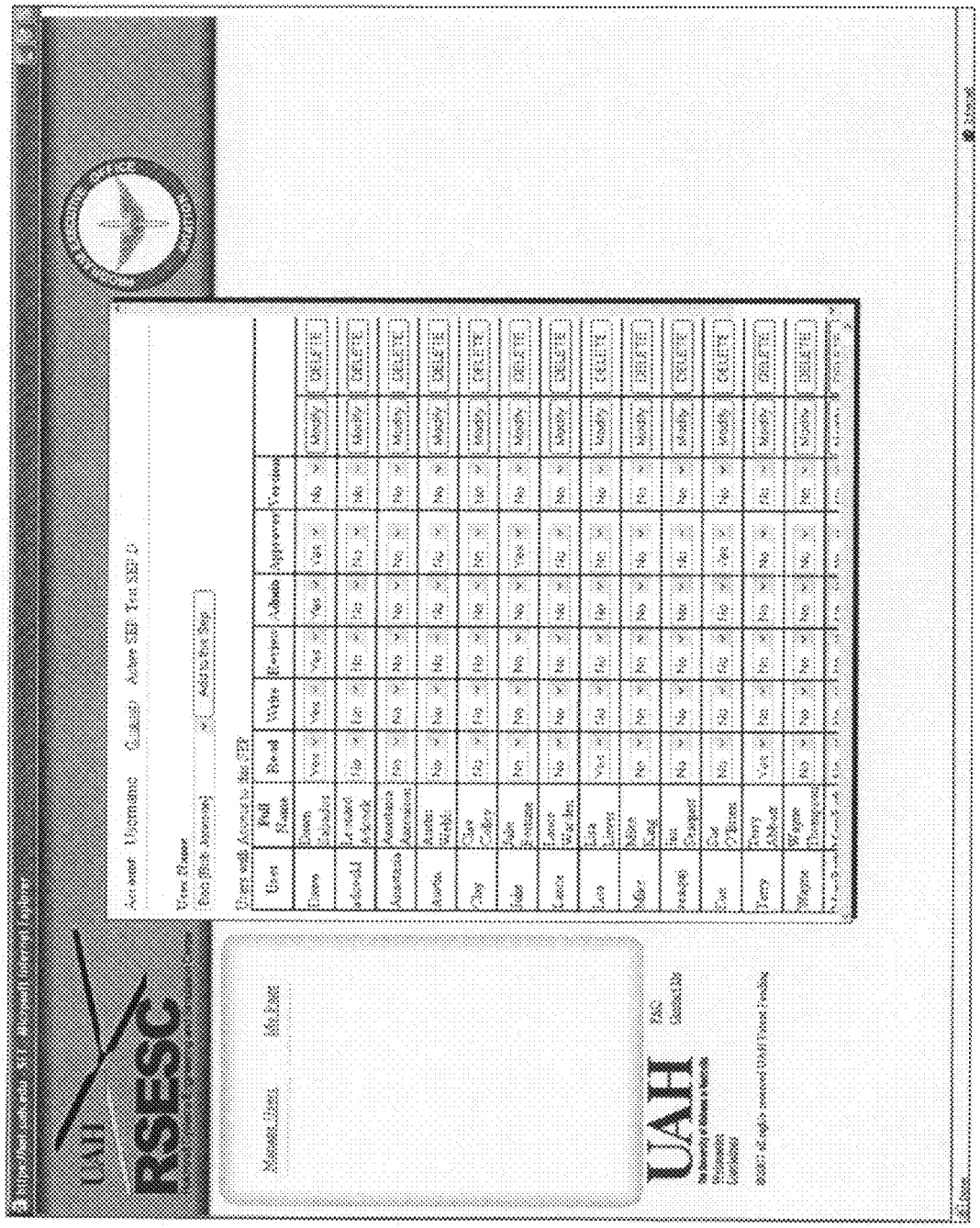
FIG. 29 is a screen shot of a Manage Users screen presented to a user having Administrator permissions in an exemplary embodiment of the present invention.

Administrators control which users have access to technical documents included in system 10. Administrators can authorize users to have access to a particular technical document and can set the permissions levels for users with respect to that document. In one embodiment, processor 14 generates the screen shown in FIG. 28, which includes a "Manage Users" link. Clicking on this link causes processor 14 to generate the screen shown in FIG. 29, which can then be used by the administrator to add or delete a user from a technical document and to modify the permission levels for a particular user with respect to the document.

Figure 30:
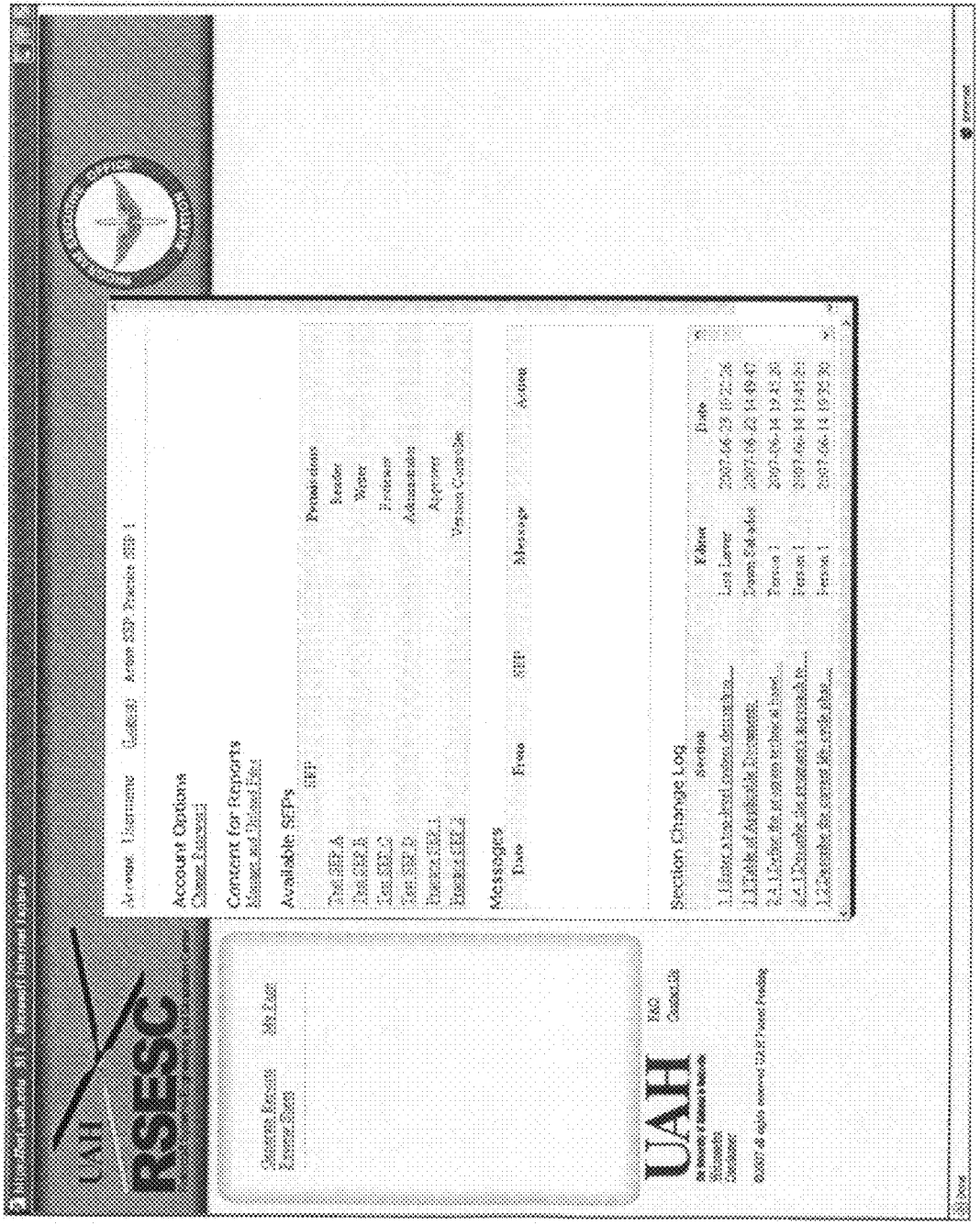
FIG. 30 is a screen shot of a My Page screen presented to a user having Approver permissions in an exemplary embodiment of the present invention.
Figure 31:
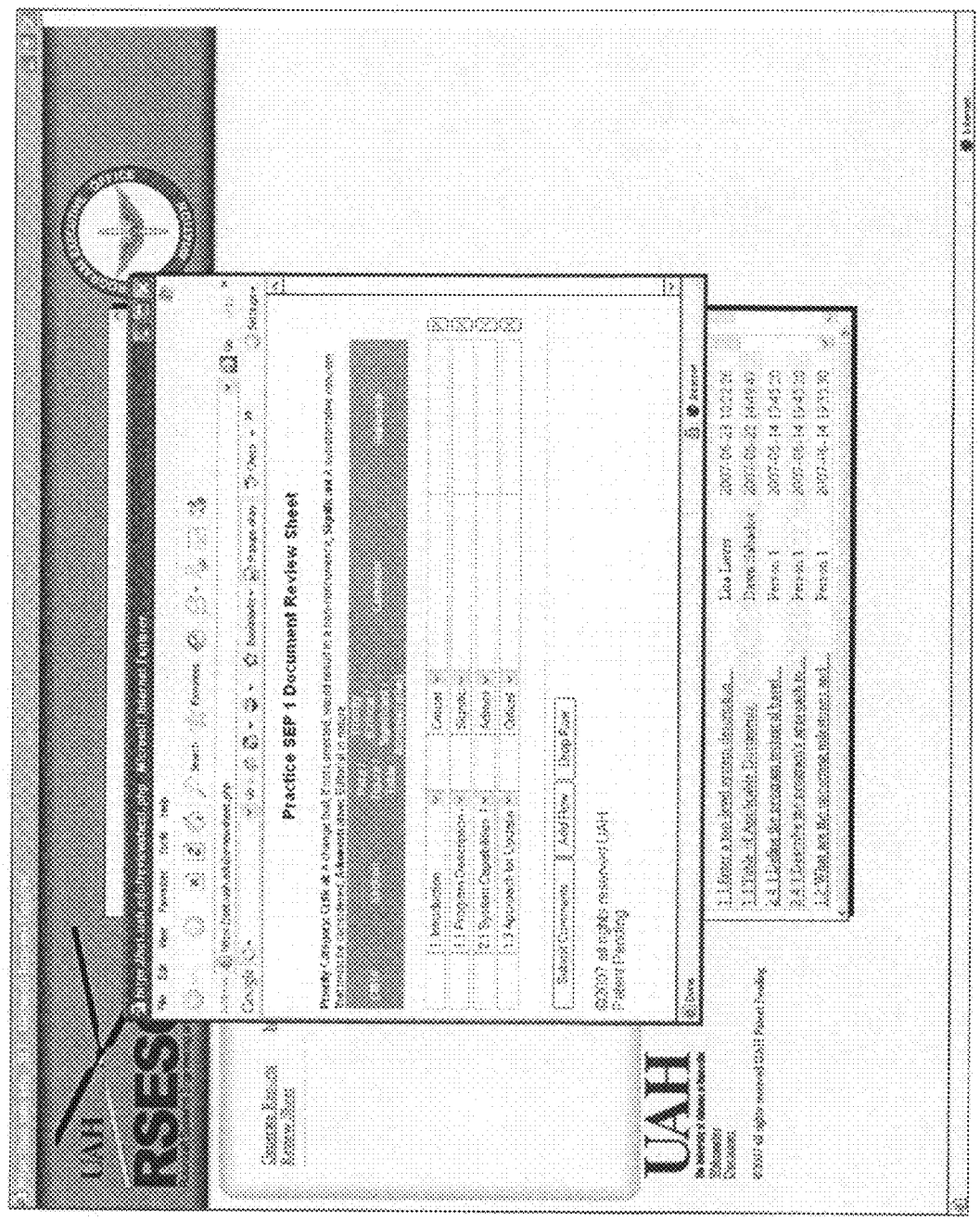
FIG. 31 is a screen shot of a Review Sheet screen presented to a user having Approver permissions in an exemplary embodiment of the present invention.
Figure 32:
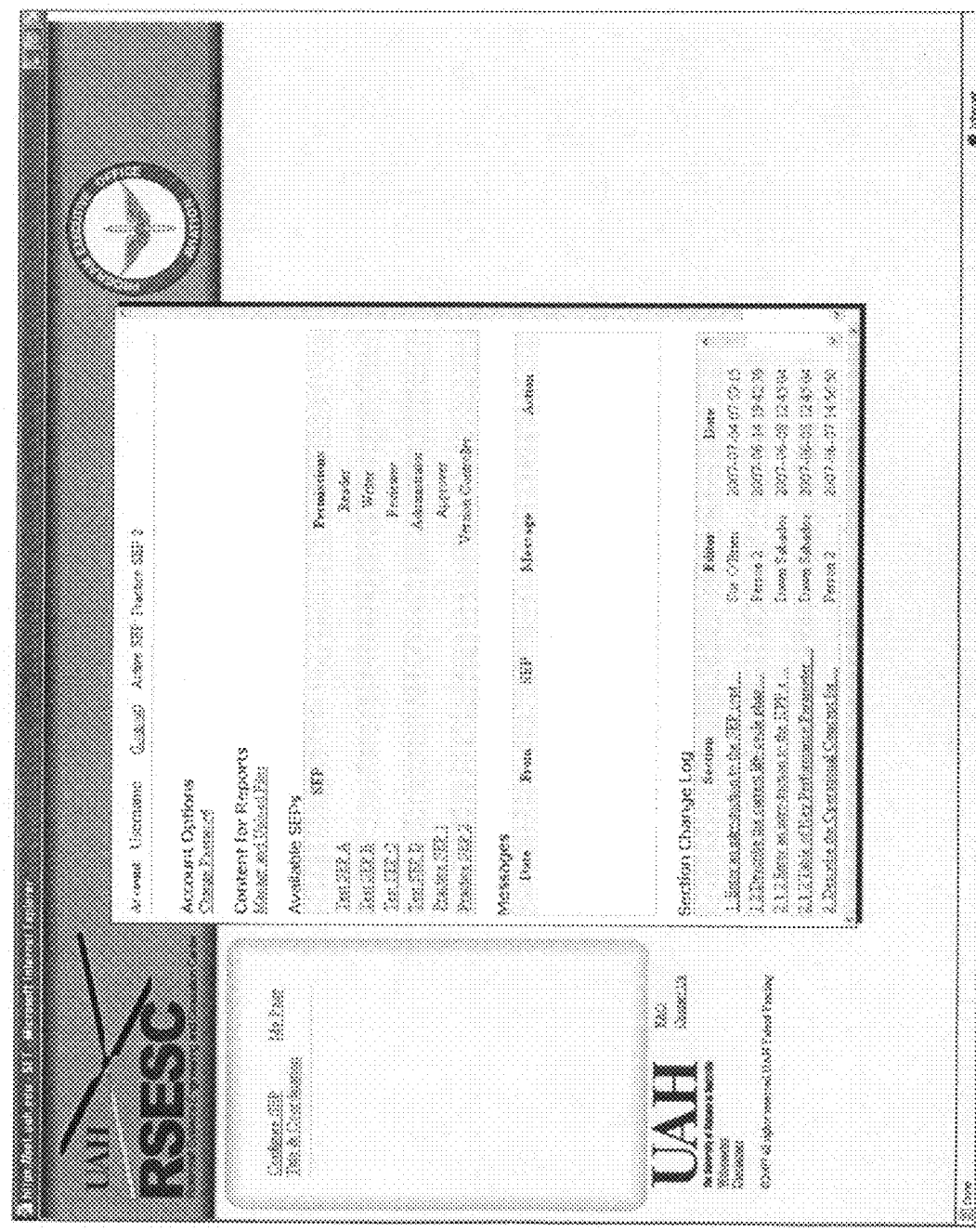
FIG. 32 is a screen shot of a My Page screen presented to a user having Version Controller permissions in an exemplary embodiment of the present invention.
Figure 33:
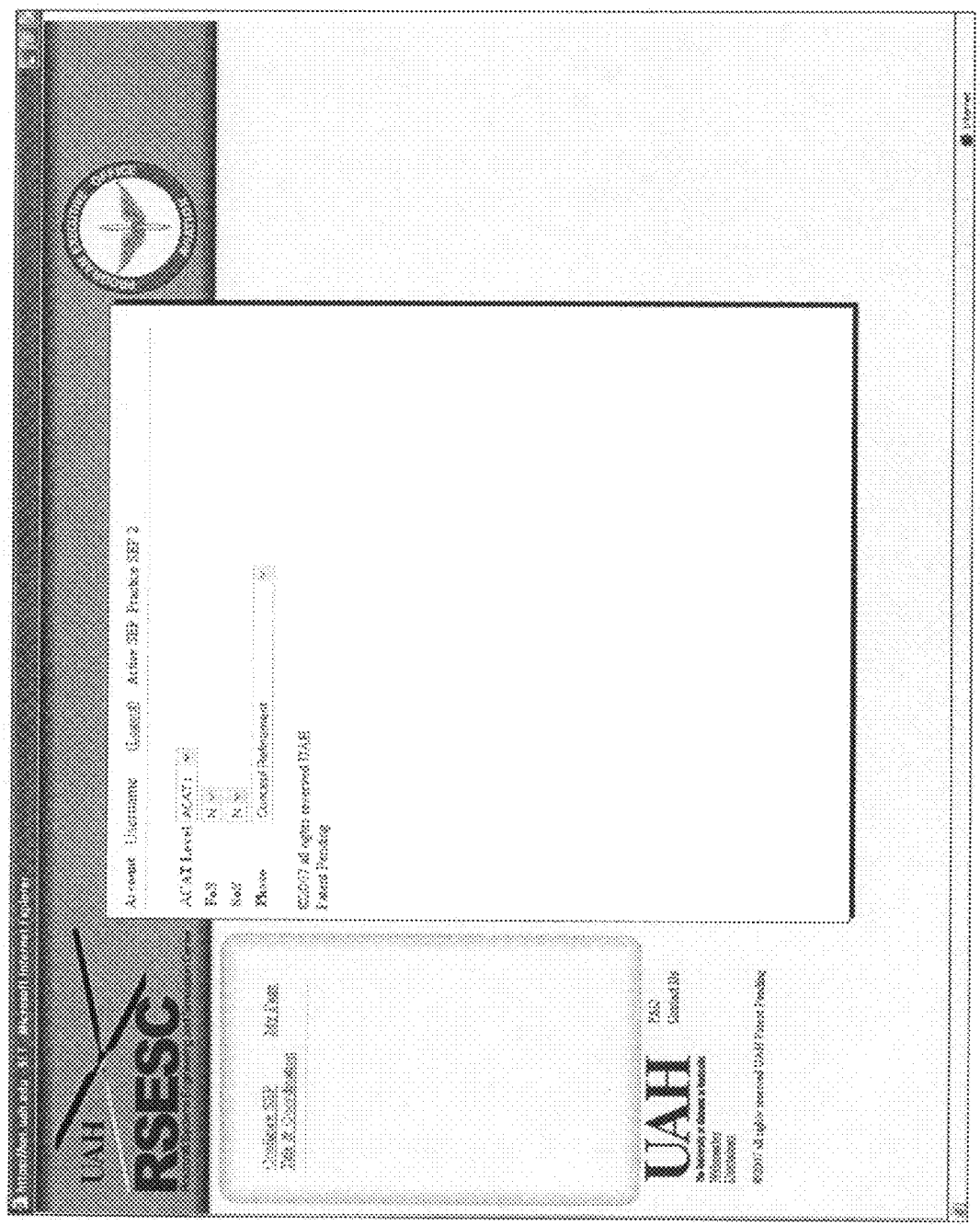
FIG. 33 is a screen shot of a Configure Technical Document screen presented to a user having Version Controller permissions in an exemplary embodiment of the present invention.
Figure 34:
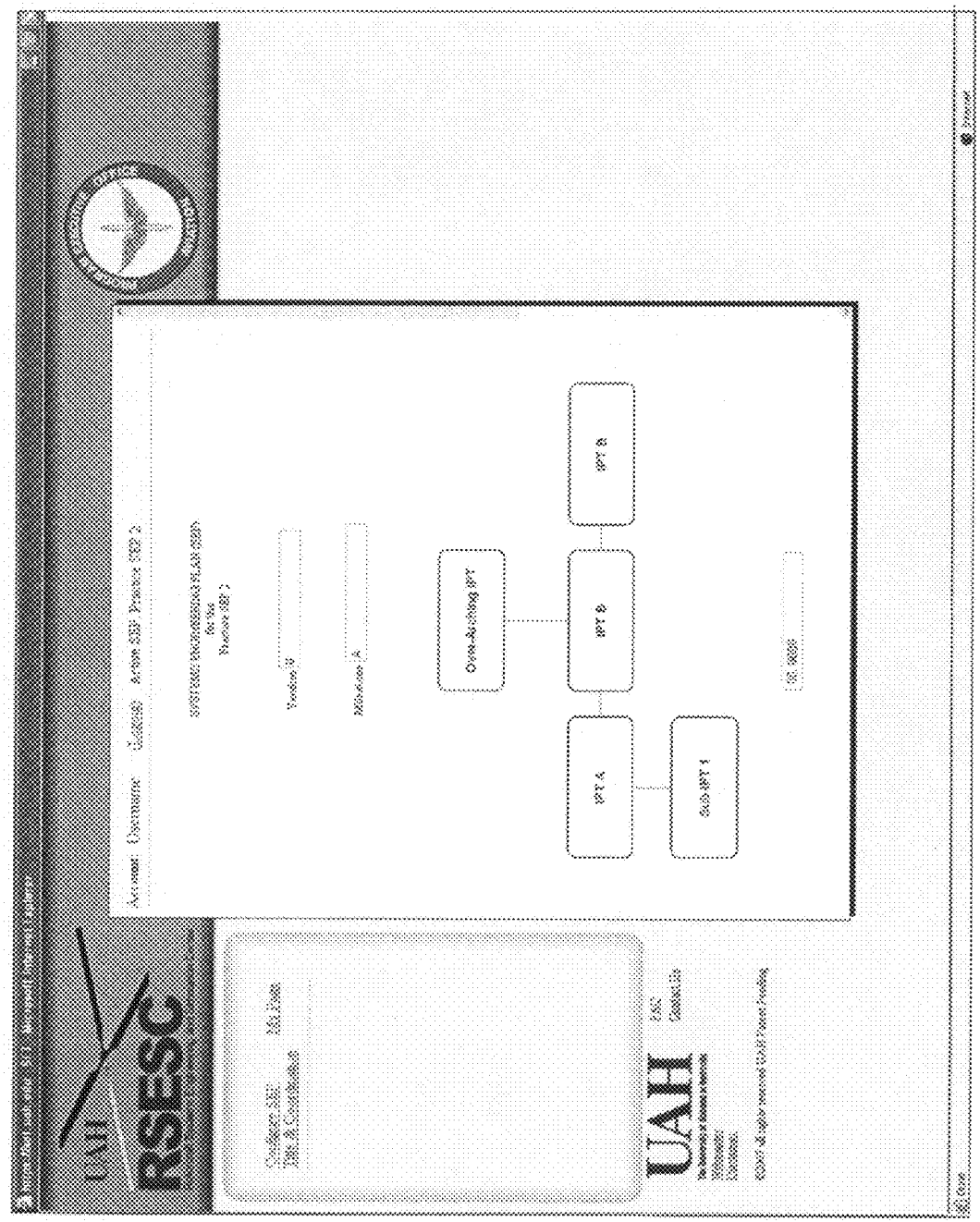
FIGS. 34-35 are screen shots of Title & Coordination screens presented to a user having Version Controller permissions in an exemplary embodiment of the present invention.
Figure 35:
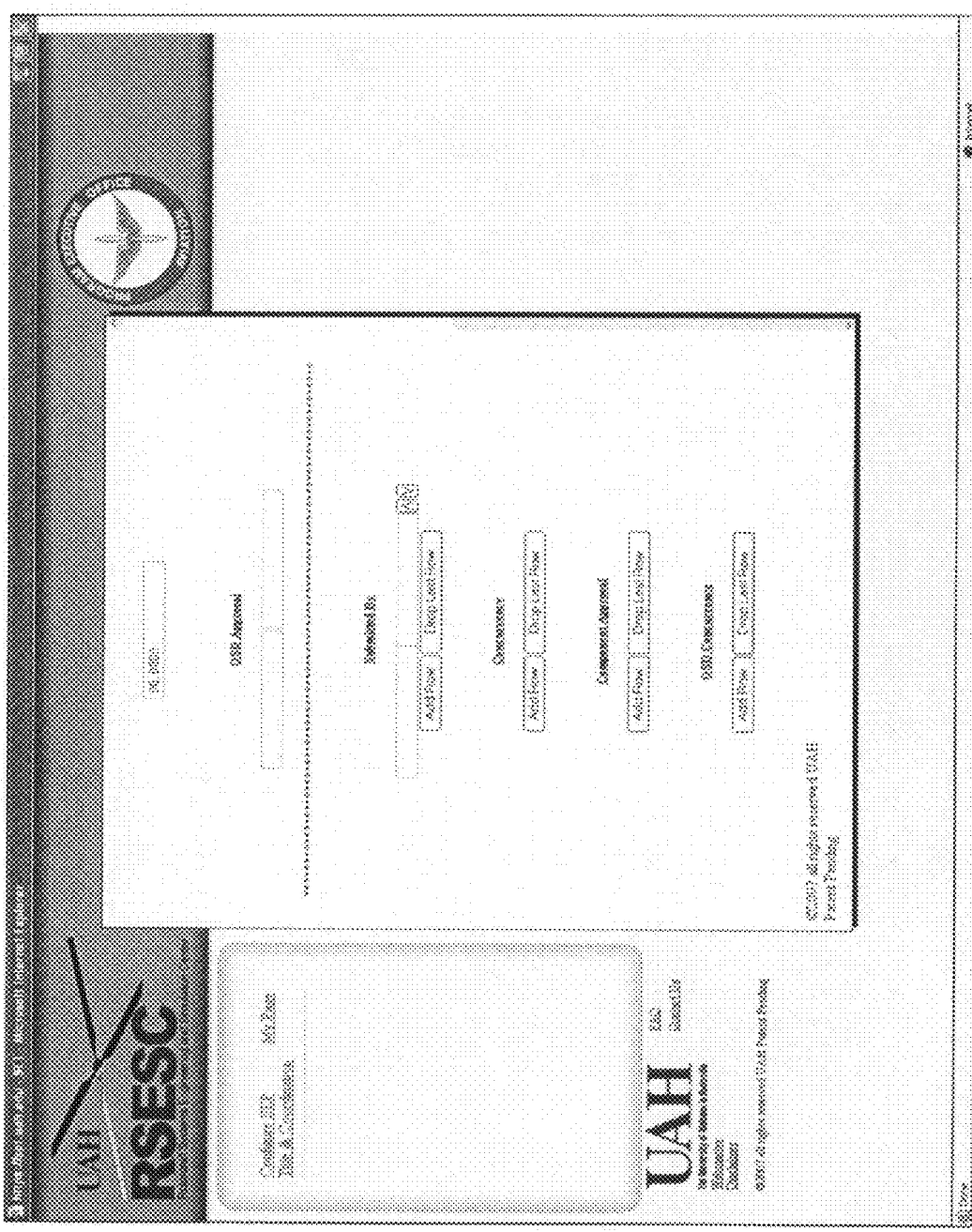

Approvers approve technical documents for submission to the agency requiring the documents and submit comments if a document is not acceptable. Approvers are notified via email when the writers and reviewers associated with a document consider the document ready for approval. In one embodiment, processor 14 generates the screen shown in FIG. 30 for use by approvers. This screen allows approvers to generate reports as discussed previously with other users (the "Generate Reports" link) and allows approvers to submit comments using a "Review Sheet" link. Clicking on this link generates the screen shown in FIG. 31, which can then be used by approvers to submit comments relating to a technical document. The review sheet allows approvers to rank the priority of comments as critical (change must be made in order to avoid a non-concurrence), significant (substantive concern that must be considered), and administrative (editorial in nature).

Version controllers are responsible for configuring technical documents by identifying the acquisition category associated with the documents, indicating whether the systems described in the documents are part of a Family of Systems (FoS) or a System of Systems (SoS), and identifying the development phase of systems described in the documents. Version controllers are also responsible for setting up the Title & Coordination pages for technical documents. Example screens generated by processor 14 for this purpose are shown in FIGS. 32-35.

Figure 36:
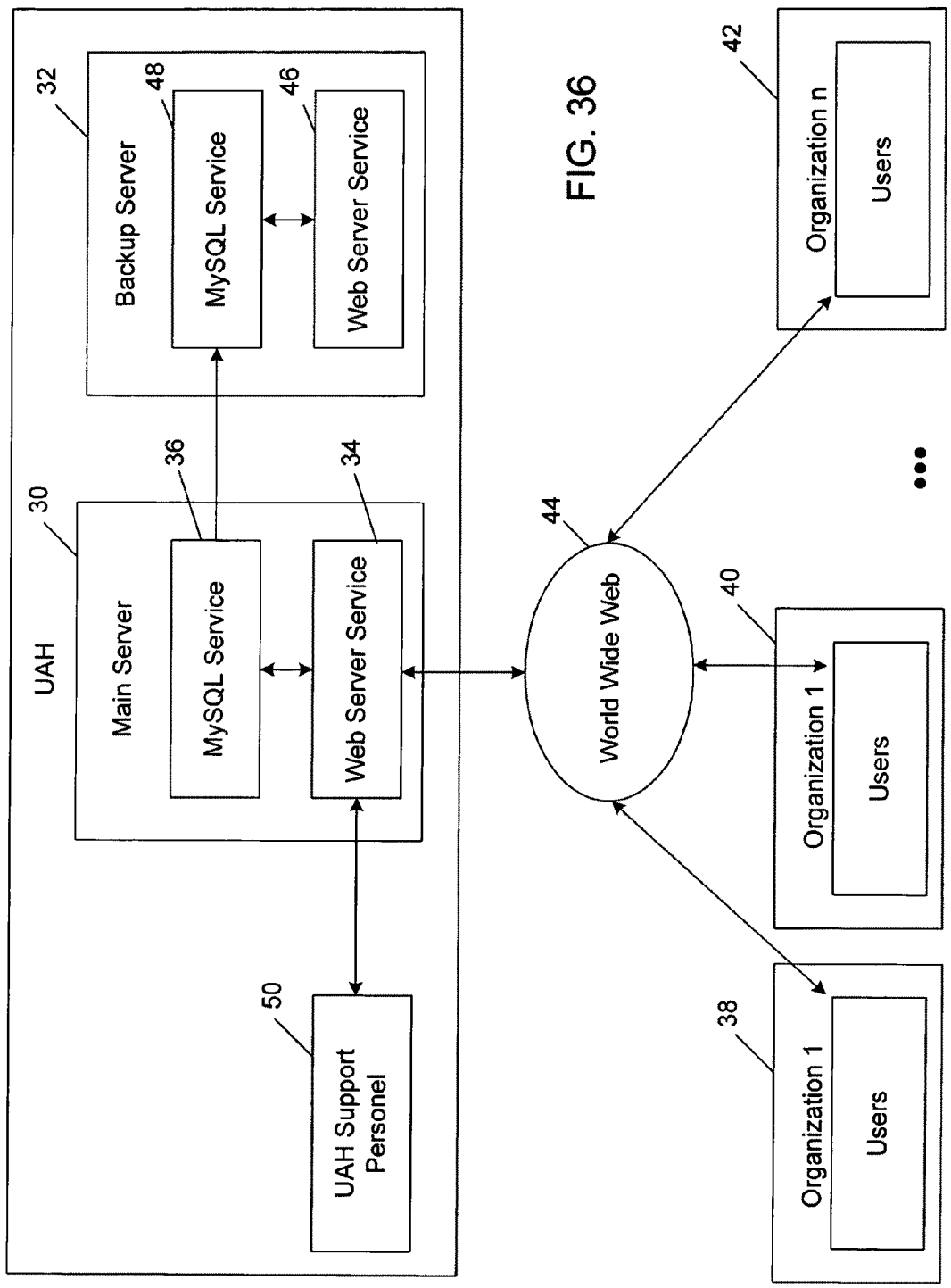
FIG. 36 is a block diagram showing another exemplary embodiment of the present invention.

Another exemplary system is shown in FIG. 36. This system includes a main server computer system 30 and a backup server computer system 32. System 30 includes a web server service 34 and a MySQL service 36, both of which operate together perform the functions discussed above with respect to database 12 and processor 14. System 30 is designed to be connected to multiple client computers, including client computers 38, 40, and 42, using the World Wide Web 44. System 32 is a backup system for system 30 and operates in the same manner. In this regard, system 32 includes a Web Server Service 46 and a MySQL Service 48. UAH Support Personnel 50 are responsible for maintaining systems 30 and 32 so that they operate properly.

Server computer system 10 of the present invention can be implemented in software (e.g., firmware), hardware, or a combination thereof. In the currently contemplated best mode, server computer system 10 is implemented using software, as an executable program, and is executed by a special or general purpose digital computer, such as a personal computer (PC; IBM-compatible, Apple-compatible, or otherwise), workstation, minicomputer, or mainframe computer. An example of a general purpose computer that can implement server computer system 10 is shown in FIG. 1.

Generally, in terms of hardware architecture, server computer 10 includes processor 14, memory (omitted for simplicity), and one or more input and/or output (I/O) devices or peripherals (omitted for simplicity) that are communicatively coupled via a local interface (omitted for simplicity). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

Processor 14 is a hardware device for executing software, particularly that stored in memory. Processor 14 can be any custom made or commercially available processor, a central processing unit (CPU), an auxiliary processor among several processors associated with server computer system 10, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation.

The memory can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remote from one another, but can be accessed by processor 14.

The software in memory may include one or more separate programs, each of which comprises an ordered listing of executable instructions for implementing logical functions. In the example of FIG. 1, the software in the memory includes a suitable operating system. A nonexhaustive list of examples of suitable commercially available operating systems is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). The operating system essentially controls the execution of other computer programs and provides scheduling, input-output control, file and data management, memory management, and communication control and related services.

The software included in server computer system 10 may be a source program, executable program (object code), script, or any other entity comprising a set of instructions to be performed. When a source program, then the program needs to be translated via a compiler, assembler, interpreter, or the like, which may or may not be included within the memory, so as to operate properly in connection with the operating system. Furthermore, the software can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices may include input devices, for example but not limited to, a keyboard, mouse, scanner, microphone, etc. Furthermore, the I/O devices may also include output devices, for example but not limited to, a printer, display, etc. Finally, the I/O devices may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If server computer system 10 is a PC, workstation, or the like, the software in the memory may further include a basic input output system (BIOS) (omitted for simplicity). The BIOS is a set of essential software routines that initialize and test hardware at startup, start the operating system, and support the transfer of data among the hardware devices. The BIOS is stored in ROM so that the BIOS can be executed when server computer system 10 is activated.

When server computer system 10 is in operation, processor 14 is configured to execute software stored within the memory, to communicate data to and from the memory, and to generally control operations of the server computer system 10 pursuant to the software. The software included with server computer system 10 and the operating system, in whole or in part, but typically the latter, are read by processor 14, perhaps buffered within processor 14, and then executed.

It should be noted that the software included with server computer system 10 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The software included with server computer system 10 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where server computer system 10 is implemented in hardware, server computer system 10, including processor 14, can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A document generation system, comprising:
a plurality of client computer systems; and
a server computer system having memory for storing data defining a document, the document having a plurality of sections, the server computer system configured to communicate with the client computer systems via a network, the server computer system configured to define a plurality of permission levels, including at least a first permission level, a second permission level, and a third permission level, and to assign each of a plurality of users to a respective one of the permission levels, wherein users assigned to the first permission level are authorized by the server computer system to at least modify the document, wherein users assigned to the second permission level are authorized by the server computer system to at least review the document and make comments for reading by at least one user assigned to the first permission level, and wherein users assigned to the third permission level are authorized by the server computer system to at least review the document and approve the document on a section-by-section basis, the server computer system configured to permit a first user assigned to the first permission level to edit a first section of the document and to provide a first input for indicating that the first user deems the first section to be ready for review by at least one user assigned to the second permission level, the server computer system further configured to automatically send a notice to a second user assigned to the second permission level in response to the first input, the server computer system configured to permit the second user to review the first section, provide a comment related to the first section, and provide a second input for indicating that the second user approves the first section for review by at least one user assigned to the third permission level, the server computer system configured to provide the comment from the second user to the first user and to automatically send a notice to a third user assigned to the third permission level in response to the second user input, the server computer system configured to permit the third user to review the first section and provide a third input for indicating that the third user approves the first section, the server computer system configured to associate each section of the document with a respective status indicator indicating whether the respective section has been approved by at least one user assigned to the second permission level, the server computer system configured to update the status indicator assigned to the first section in response to the second input to indicate that the first section has been approved by at least one user assigned to the second permission level.

2. The document generation system of claim 1, wherein the server computer system is configured to associate an icon with the first section and to color code the icon.

3. The document generation system of claim 2, wherein the server computer system is configured to color code the icon to indicate whether the first section is approved by at least one user assigned to the second permission level.

4. The document generation system of claim 3, wherein the server computer system is configured to color code the icon to indicate whether the first section is currently accessed by at least one user.

5. The document generation system of claim 1, wherein the server computer system is configured to permit at least one user to access and modify a second section of the document while the first user is modifying the first section.

6. The document generation system of claim 1, wherein the server computer system is configured to disable modifications of the first section by the first user in response to the first input.

7. The document generation system of claim 6, wherein the server computer system is configured to enable modifications of the first section by the first user in response to the comment.

8. The document generation system of claim 1, wherein the server computer system is further configured to provide an indication when each section of the document has been approved by at least one user assigned to the third permission level.

9. A document generation system, comprising:
memory for storing data defining a document, the document having a plurality of sections; and
a processor configured to define a plurality of permission levels, including at least a first permission level, a second permission level, and a third permission level, and to assign each of a plurality of users to a respective one of the permission levels, wherein users assigned to the first permission level are authorized by the processor to at least modify the document, wherein users assigned to the second permission level are authorized by the processor to at least review the document and make comments for reading by at least one user assigned to the first permission level, and wherein users assigned to the third permission level are authorized by the processor to at least review the document and approve the document on a section-by-section basis, the processor configured to permit a first user assigned to the first permission level to edit a first section of the document and to provide a first input for indicating that the first user deems the first section to be ready for review by at least one user assigned to the second permission level, the processor further configured to automatically send a notice to a second user assigned to the second permission level in response to the first input, the processor configured to permit the second user to review the first section, provide a comment related to the first section, and provide a second input for indicating that the second user approves the first section for review by at least one user assigned to the third permission level, the processor configured to provide the comment from the second user to the first user and to automatically send a notice to a third user assigned to the third permission level in response to the second user input, the server computer system configured to permit the third user to review the first section and provide a third input for indicating that the third user approves the first section, the processor configured to associate each section of the document with a respective status indicator indicating whether the respective section has been approved by at least one user assigned to the second permission level, the processor configured to update the status indicator assigned to the first section in response to the second input to indicate that the first section has been approved by at least one user assigned to the second permission level.

10. A document generation method, comprising the steps of:
  storing, in memory, data defining a document;
  defining a plurality of permission levels, including at least a first permission level, a second permission level, and a third permission level;
  assigning each of a plurality of users to a respective one of the permission levels;
  authorizing users assigned to the first permission level to at least modify the document;
  authorizing users assigned to the second permission level to at least review the document and make comments for reading by at least one user assigned to the first permission level;
  authorizing users assigned to the third permission level to at least review the document and approve the document on a section-by-section basis;
  receiving first user inputs from a first user assigned to the first permission level;
  editing a first section of the document based on the first user inputs;
  determining when the first section is ready for review by at least one user assigned to the second permission level based on at least one of the first user inputs;
  automatically sending a notice to a second user assigned to the second permission level based on the determining step;
  receiving from the second user a comment relating to the first section;
  providing the comment to the first user;
  receiving a second user input from the second user indicating that the first section is approved for review by at least one user assigned to the third permission level;
  automatically sending a notice to a third user assigned to the third permission level in response to the second user input;
  receiving a third user input from the third user indicating that the first section is approved by the third user;
  associating each section of the document with a respective status indicator indicating whether the respective section has been approved by at least one user assigned to the second permission level; and
  updating the status indicator associated with the first section in response to the second user input.

11. The method of claim 10, further comprising the steps of:
  associating an icon with the first section; and
  color coding the icon.

12. The method of claim 11, wherein the color coding step comprises the step of indicating whether the first section is approved by at least one user assigned to the second permission level.

13. The method of claim 12, wherein the color coding step further comprises the step of indicating whether the first section is currently accessed by at least one user.

14. The method of claim 10, further comprising the step of editing a second section of the document based on user inputs from at least one user during the step of editing the first section of the document.

15. The method of claim 10, further comprising the step of disabling modifications of the first section by the first user based on the determining step.

16. The method of claim 15, further comprising the step of enabling modifications of the first section by the first user in response to the comment.

17. The method of claim 10, further comprising the step of providing an indication when each section of the document has been approved by at least one user assigned to the third permission level.

* * * * *